US012762163B2

(12) United States Patent
Bromley et al.

(10) Patent No.: US 12,762,163 B2
(45) Date of Patent: Oct. 13, 2026

(54) BIMODAL DATA EXPLORATION TOOL FOR INTERACTIVE TEXT AND VISUAL ANALYSIS

(71) Applicant: Salesforce, Inc., San Francisco, CA (US)

(72) Inventors: Dennis Nathan Bromley, Seattle, WA (US); Vidya Raghavan Setlur, Portola Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 70 days.

(21) Appl. No.: 18/802,611

(22) Filed: Aug. 13, 2024

(65) Prior Publication Data

US 2025/0335474 A1 Oct. 30, 2025

Related U.S. Application Data

(60) Provisional application No. 63/640,846, filed on Apr. 30, 2024.

(51) Int. Cl.
*G06F 16/30* (2019.01)
*G06F 16/332* (2019.01)
*G06F 16/383* (2019.01)

(52) U.S. Cl.
CPC ........ *G06F 16/3328* (2019.01); *G06F 16/383* (2019.01)

(58) Field of Classification Search
CPC ........................... G06F 16/3328; G06F 16/383
See application file for complete search history.

(56) References Cited

U.S. PATENT DOCUMENTS 11,036,769 B1 * 6/2021 Schultz ................. G06F 16/288

OTHER PUBLICATIONS

Kantharaj et al., Chart-to-Text: A Large-Scale Benchmark for Chart Summarization. 2022 [retrieved Dec. 10, 2025]. Retrieved from the Internet: https://arxiv.org/abs/2203.06486 (Year: 2022).*
Masson et al., Charagraph: Interactive Generation of Charts for Realtime Annotation of Data-Rich Paragraphs. In Proceedings of the 2023 CHI Conference on Human Factors in Computing Systems (CHI '23). 2023 [retrieved Dec. 10, 2025]. Retrieved from the Internet: https://doi.org/10.1145/3544548.3581091 (Year: 2023).*

(Continued)

*Primary Examiner* — Kristopher Andersen
(74) *Attorney, Agent, or Firm* — Morgan, Lewis & Bockius LLP

(57) ABSTRACT

A computing device displays first data describing a dataset. At least a portion of the first data is encoded with metadata that links the first data to data values and/or data fields of the dataset. The computing device receives a user interaction with a first affordance. The user interaction specifies a first portion of the first data, which includes at least a first data field of the dataset. In response to receiving the user interaction, the computing device retrieves metadata corresponding to the first portion of the first data, and generates second data describing the dataset according to (i) the at least the first data field and (ii) data values of the at least the first data field specified in the metadata, corresponding to the first portion of the first data. The computing device concurrently displays the first data and the second data describing the dataset.

19 Claims, 29 Drawing Sheets

(56) References Cited

OTHER PUBLICATIONS

Lundgard, "Accessible Visualization via Natural Language Descriptions: A Four-Level Model of Semantic Content," © 2021 IEEE, This is the author's version of the article that has been published in IEEE Transactions on Visualization and Computer Graphicsm Oct. 8, 2021, 11 pgs. available at https//vis.csail.mit.edu/pubs/vis-text-model.

* cited by examiner

110

Semantic Levels 248

| Level | Role | Modality | Example |
|---|---|---|---|
| 4 | Insights and integration of domain knowledge | Text | "The steady increase in CEO pay may be playing a role in the recent uptick in investor activism." |
| 3 | Relationships among data and statistics | Text, chart | Correlations, clustering, outliers, and trends |
| 2 | Statistics | Text, chart | STDEV (profit) |
| 1 | Base Data | ~ Text, chart | Rows and columns of a SQL database |

Figure 2B

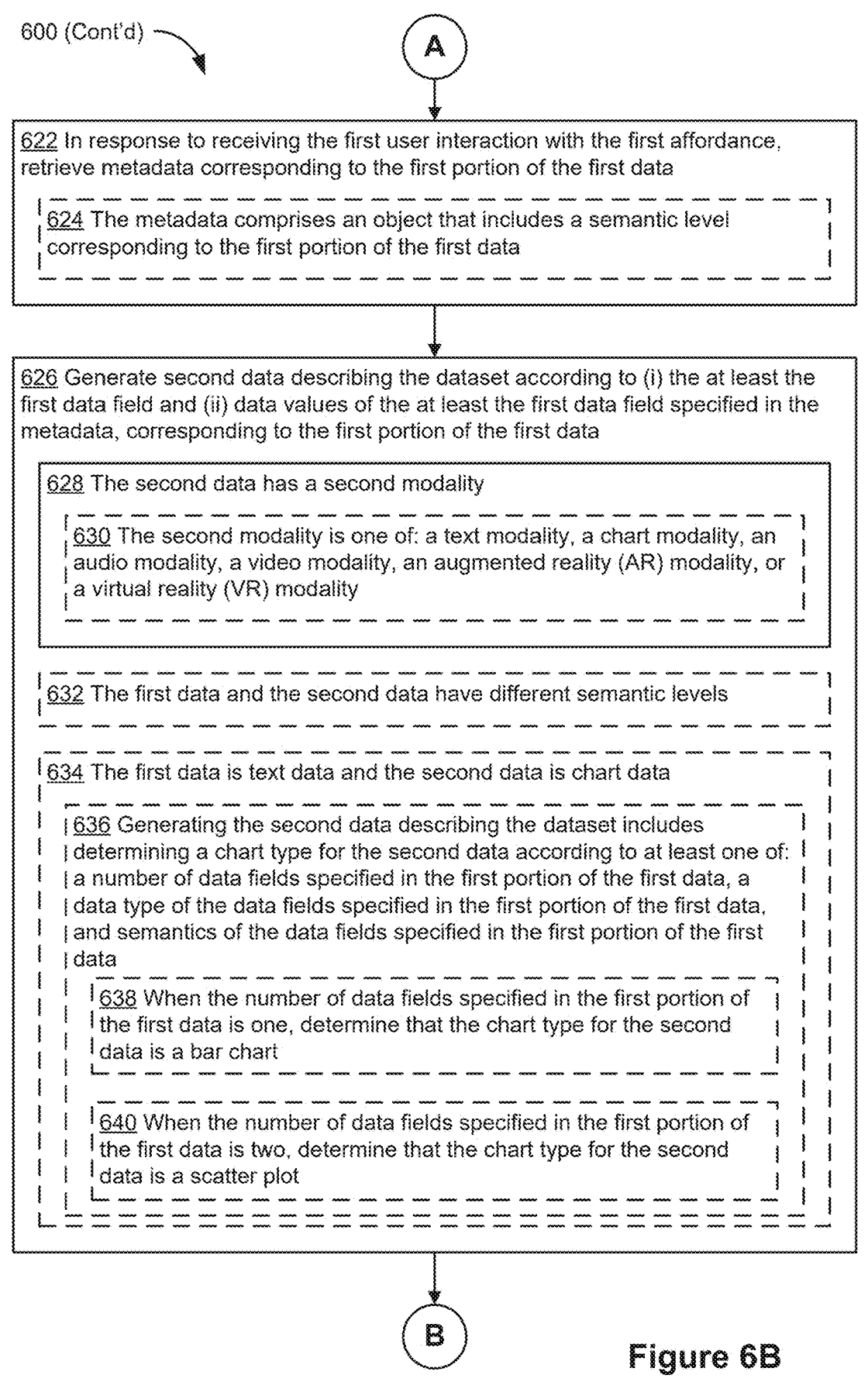

600 (Cont'd)

A

622 In response to receiving the first user interaction with the first affordance, retrieve metadata corresponding to the first portion of the first data 624 The metadata comprises an object that includes a semantic level corresponding to the first portion of the first data 626 Generate second data describing the dataset according to (i) the at least the first data field and (ii) data values of the at least the first data field specified in the metadata, corresponding to the first portion of the first data 628 The second data has a second modality 630 The second modality is one of: a text modality, a chart modality, an audio modality, a video modality, an augmented reality (AR) modality, or a virtual reality (VR) modality 632 The first data and the second data have different semantic levels 634 The first data is text data and the second data is chart data 636 Generating the second data describing the dataset includes determining a chart type for the second data according to at least one of: a number of data fields specified in the first portion of the first data, a data type of the data fields specified in the first portion of the first data, and semantics of the data fields specified in the first portion of the first data 638 When the number of data fields specified in the first portion of the first data is one, determine that the chart type for the second data is a bar chart 640 When the number of data fields specified in the first portion of the first data is two, determine that the chart type for the second data is a scatter plot

B

Figure 6B

BIMODAL DATA EXPLORATION TOOL FOR INTERACTIVE TEXT AND VISUAL ANALYSIS

RELATED APPLICATIONS

This application claims priority to U.S. Provisional Patent Application No. 63/640,846, filed Apr. 30, 2024, titled "DASH: A Bimodal Data Exploration Tool for Interactive Text and Visualizations," which is incorporated by reference herein in its entirety.

TECHNICAL FIELD

The disclosed embodiments relate generally to data analysis, and more specifically to systems, methods, and user interfaces for interactive textual and visual data analysis.

BACKGROUND

Integrating textual content, such as titles, annotations, and captions, with visualizations facilitates comprehension and takeaways during data exploration. Existing tools often lack mechanisms for integrating meaningful text with visual data.

SUMMARY

Text and visual modalities each excel at different aspects of data analysis. On one hand, visual charts can compress large amounts of data into a single data-rich image. On the other hand, there is a reason why news agencies, blogs, and journal articles tend to be text-first documents with charts relegated to supporting figures, as publications such as these emphasize higher level data-analysis concepts such as inter-data relationships, related expertise, conceptual discussions, and speculative narratives such as scenario analysis.

The interplay between text and visualizations has become an important aspect of enhancing comprehension during data exploration. Research underscores the critical role of text in shaping a reader's interpretation of data visualizations, where it serves to explain construction methods, summarize statistical attributes, and offer broader contextual insights. Effective textual descriptions not only reinforce the visual elements of a chart to ease cognitive load but also improve reader engagement and trust. However, existing tools often fall short of providing robust support for authoring text alongside visualizations, typically offering limited automated solutions for title generation and chart/text alignment.

There is a growing consensus within the research community that text should be treated as co-equal to visualization. This perspective is supported by studies indicating that the synergistic use of text and visuals can significantly enhance data interpretation and user comprehension. The present disclosure continues this line of research by exploring how interactive and dynamically generated text can complement the visual analysis process.

Some embodiments of the present disclosure are directed to a tool called "Data Analysis using Semantic Hierarchies," or DASH. As disclosed, in some embodiments, DASH supports interactive data exploration using both text and visualizations. Charts tend to support lower-level semantic analysis whereas text can support both lower- and higher-level semantic analysis. In some embodiments, DASH leverages the integration of semantic levels in text for data analysis, and enables textual content to be generated through direct interactions with the visualization and vice-versa.

As disclosed, DASH is a bimodal data exploration tool that supports integrating semantic levels into the interactive process of visualization and text-based analysis. DASH enables bidirectional dataflow between data and text rendering, so users are able to construct high-level data narratives and low-level charts that are reflective of the underlying data semantics.

In some embodiments, DASH operationalizes a modified version of a semantic hierarchy model that categorizes data descriptions into four levels ranging from basic encodings to high-level insights. By leveraging this structured semantic level framework along with text generation capabilities of large language models (LLMs), DASH enables data-driven narratives via user interaction, such as dragging and dropping data references. These interactions dynamically alter the narrative and visualization context across the different semantic levels of detail.

In some embodiments, DASH allows for the real-time adaptation of both text and visualizations as users interactively navigate across various semantic levels of text description. DASH implements a mixed initiative approach that leverages an LLM to enhance interactivity and semantic coherence between text and visualizations. The tool employs a semantic framework, allowing for dynamic interaction and bidirectional manipulation of both text and visual elements in real-time.

The systems, methods, and user interfaces of this disclosure each have several innovative aspects, no single one of which is solely responsible for the desirable attributes disclosed herein.

In accordance with some embodiments, a method of analyzing data is performed at a computing device that includes a display, one or more processors, and memory. The method includes displaying, via a user interface, first data describing a dataset. The first data has a first modality and at least a portion of the first data is encoded with metadata that links the first data to data values and/or data fields of the dataset. The method includes receiving a first user interaction with a first affordance of the user interface. The first user interaction further specifies a first portion of the first data that is displayed via the user interface. The first portion of the first data includes at least a first data field of the dataset. The method includes, in response to receiving the first user interaction with the first affordance: (a) retrieving metadata corresponding to the first portion of the first data; (b) generating second data describing the dataset according to (i) the at least the first data field and (ii) data values of the at least the first data field specified in the metadata, corresponding to the first portion of the first data, the second data having a second modality; and (c) displaying, concurrently on the user interface, the first data and the second data describing the dataset In some embodiments, the first data and the second data have different semantic levels.

In some embodiments, the first modality or the second modality is one of: a text modality, a chart modality, an audio modality, a video modality, an augmented reality (AR) modality, or a virtual reality (VR) modality.

In some embodiments, the method includes after concurrently displaying, on the user interface, the first data and the second data describing the dataset: receiving a second user interaction with the first affordance. The second user interaction specifies a second portion of the second data that is displayed via the user interface. The method includes, in response to receiving the second user interaction with the first affordance: (i) retrieving metadata corresponding to the second portion of the second data; (ii) generating third data describing the dataset according to a data field and/or data value of the dataset specified in the metadata corresponding to the second portion of the second data, where the third data has the same modality as the second data; and (iii) displaying the first data, the second data, and the third data concurrently on the user interface.

In some embodiments, the method includes after concurrently displaying, on the user interface, the first data and the second data describing the dataset: receiving a second user interaction with a second affordance of the user interface, different from the first affordance of the user interface. The second user interaction specifies a second portion of the second data that is displayed via the user interface. The method includes in response to receiving the second user interaction with the first affordance: (i) retrieving metadata corresponding to the second portion of the second data; (ii) generating third data describing the dataset according to a data field and/or data value of the dataset specified in the metadata corresponding to the second portion of the second data, where the third data has a different modality from the second data; and (iii) displaying the first data, the second data, and the third data concurrently on the user interface.

In accordance with some embodiments, a computing device includes a display, one or more processors, and memory coupled to the one or more processors. The memory stores one or more programs configured for execution by the one or more processors. The one or more programs include instructions for performing any of the methods disclosed herein.

In accordance with some embodiments, a non-transitory computer readable storage medium stores one or more programs configured for execution by a computing device having a display, one or more processors, and memory. The one or more programs include instructions for performing any of the methods disclosed herein.

Thus methods, systems, and graphical user interfaces are disclosed that support interactive textual and visual data analysis.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Embodiments below, in conjunction with the following drawings in which like reference numerals refer to corresponding parts throughout the figures.

FIG. 2B illustrates semantic levels for data analysis, in accordance with some embodiments.

FIGS. 6A to 6E provide a flowchart of a method for analyzing data, in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF EMBODIMENTS

Figure 1:
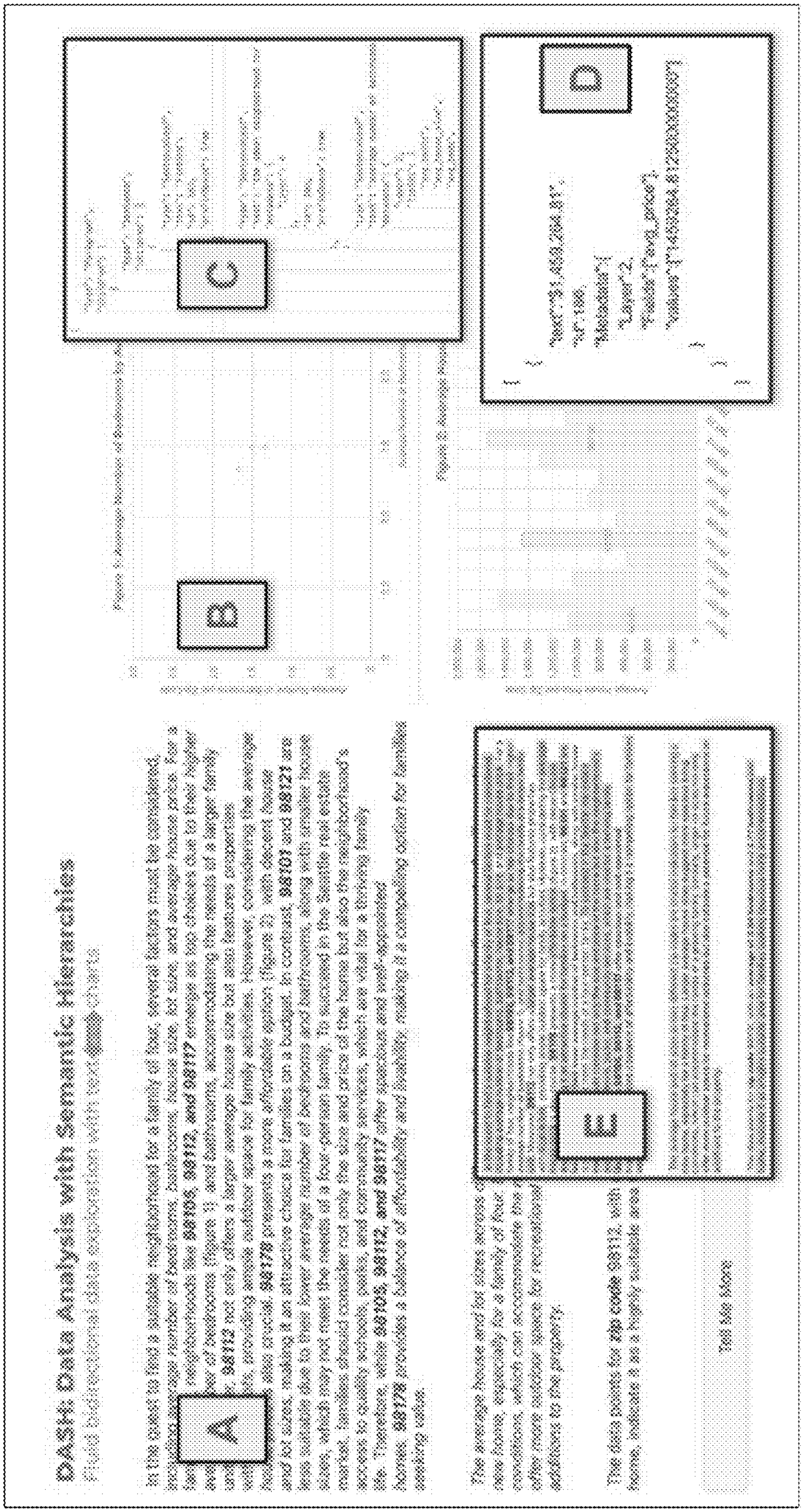
FIG. 1 illustrates an interface for supporting textual and visual data analysis, in accordance with some embodiments.

FIG. 1 illustrates a user interface 110 (e.g., a graphical user interface) for supporting textual and visual data analysis, in accordance with some embodiments. Panel A shows interactive text that contextualizes data points with semantic metadata. Panel B displays the corresponding visual data through charts. Panel C outlines a JSON metadata representation (e.g., a JSON object or JSON packet) that describes the semantic levels, data fields, and data values. Panel D illustrates a data packet (e.g., JSON packet) that facilitates bimodal/bidirectional interactive data exploration and manipulation of the narrative in real-time. The packet includes a JSON representation of semantic metadata, including the semantic level, the data field, and the data value. The packet includes the interactive text, its metadata, and identifiers that link the textual narrative to specific data points. Panel E illustrates semantic level assignments (e.g., semantic levels 248, FIG. 2B). In some embodiments, the semantic level assignments utilize color encodings that are described in the paper by Lundgard and A. Satyanarayan, titled "Accessible Visualization via Natural Language Descriptions: A Four-level Model of Semantic Content. IEEE Transactions on Visualization and Computer Graphics, 28 (1): 1073-1083, 2021. 1, 2," which is incorporated by reference herein in its entirety. For example, data corresponding to semantic level 1 (e.g., base data, such as rows and columns of a database) is encoded with the color pink, data corresponding to semantic level 2 (e.g., statistical data) is encoded with the color green, data corresponding to semantic level 3 (e.g., data depicting relationships among data and statistics) is encoded with the color yellow, and data corresponding to semantic level 4 (e.g., insight data and data that integrates domain knowledge) is encoded with the color blue.

Figure 2A:
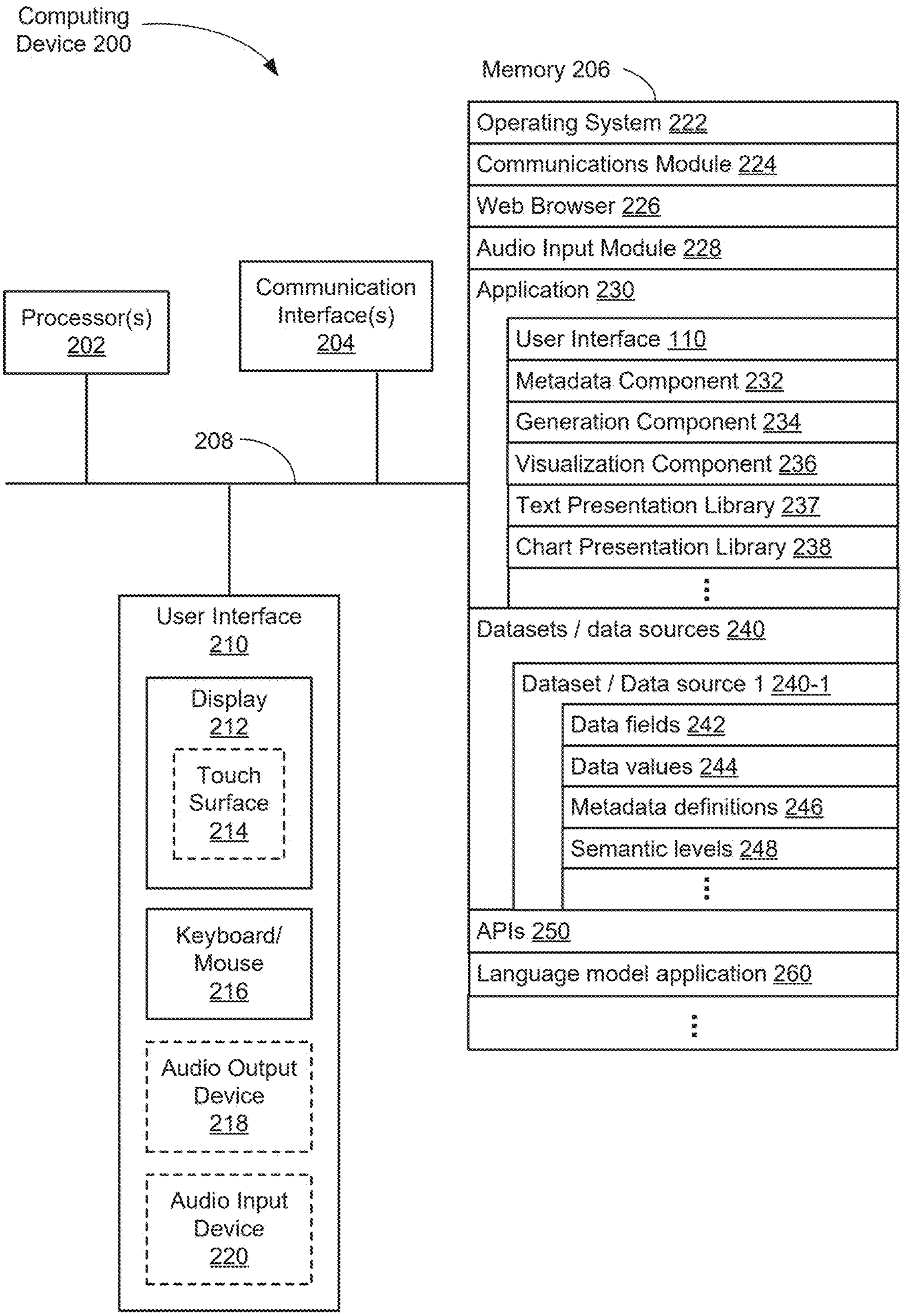
FIG. 2A provides a block diagram of a computing device, in accordance with some embodiments.

FIG. 2A is a block diagram of a computing device 200, in accordance with some embodiments. Various examples of the computing device 200 include a desktop computer, a laptop computer, a tablet computer, and other computing devices that have a display and a processor capable of running a data visualization application 230. In some embodiments, the computing device 200 is a virtual reality (VR) device, an augmented reality (AR) device, or a spatial computing device that blends digital content with the physical world. The computing device 200 typically includes one or more processing units (processors or cores) 202, one or more network or other communication interfaces 204, memory 206, and one or more communication buses 208 for interconnecting these components. In some embodiments, the communication buses 208 include circuitry (sometimes called a chipset) that interconnects and controls communications between system components.

The computing device 200 includes a user interface 210. The user interface 210 typically includes a display device 212. In some embodiments, the computing device 200 includes input devices such as a keyboard, mouse, and/or other input buttons 216. Alternatively or in addition, in some embodiments, the display device 212 includes a touch-sensitive surface 214, in which case the display device 212 is a touch-sensitive display. In some embodiments, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. In some embodiments, the computing device 200 includes an audio input device 220 (e.g., a microphone) to capture audio (e.g., speech from a user).

Figure 4:
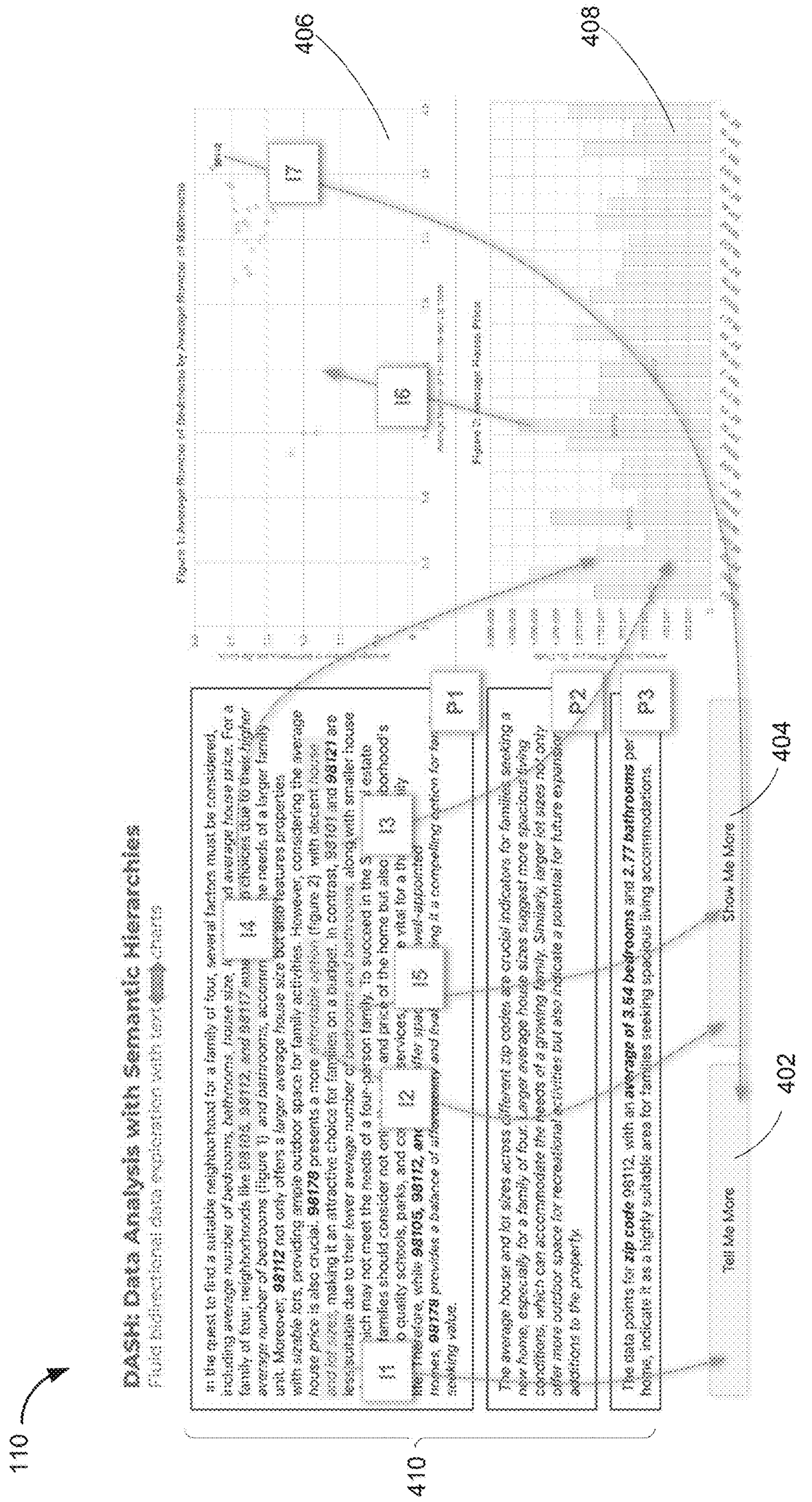
FIG. 4 shows an interface and an associated interactivity example, in accordance with some embodiments.

In some embodiments, the memory 206 includes high-speed random-access memory, such as DRAM, SRAM, DDR RAM, or other random-access solid-state memory devices. In some embodiments, the memory 206 includes non-volatile memory, such as one or more magnetic disk storage devices, optical disk storage devices, flash memory devices, or other non-volatile solid-state storage devices. In some embodiments, the memory 206 includes one or more storage devices remotely located from the processors 202. The memory 206, or alternatively the non-volatile memory devices within the memory 206, includes a non-transitory computer-readable storage medium. In some embodiments, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers (e.g., server 300) and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., a server system 300) and/or processed by an application executing on the computing device 200 (e.g., the application 230 or the language model application 260);
- an application 230 (e.g., DASH). In some embodiments, the application 230 includes: In some embodiments, the application 230 is implemented using Typescript and React. In some embodiments, the application 230 includes:
  - a user interface 110 (e.g., a graphical user interface, as illustrated in FIGS. 1, 4, and 5) for displaying data and for receiving user interaction with data;
  - a metadata component 232, for generating and/or retrieving metadata;
  - a generation component 234, for generating data describing a dataset according to metadata definitions 246;
  - a display component 236, for displaying data in the user interface 110;
  - a text presentation library 237 (e.g., Slate.JS) that maintains text-associated DASH metadata and renders the text appropriately; and
  - a chart presentation library 238 (e.g., Chart.JS)
- zero or more datasets or data sources 240, which are used by the application 230, and/or the language model application 258. In some embodiments, the datasets/data sources 240 include a first dataset or a first data source (e.g., dataset/data source 1 240-1). An example dataset is data for Seattle real estate, cleaned and aggregated to the zip code level, as described with reference to FIGS. 4 and 5A-5S In some embodiments, a respective dataset or data source 240 can include data fields 242, data values 244 corresponding to the data fields, metadata definitions 246, and semantic levels 248 (see FIG. 2B). In some embodiments, the metadata definitions 246 can comprises information on the data field, specific data values, semantic level, and the user-facing text (see, e.g., FIG. 1, Panel D);
- APIs 256 for receiving API calls from one or more applications (e.g., a web browser 226, an application 230, a search index 130, and/or a language model application 258), translating the API calls into appropriate actions, and performing one or more actions; and
- a language model application 258, which executes one or more large language models (LLMs). In some embodiments, a generative LLM (e.g., OpenAI© API model gpt-4-turbo-preview).

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc.

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set of interval or in real time based on resulting output or additional data to further train the AI technology. The AI technology may offer a variety of capabilities including text, audio, image, or content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

FIG. 2B illustrates semantic levels 248 in accordance with some embodiments. In some embodiments, the semantic levels 248 comprise a four-level (Semantic Levels 1-4, hereafter referred to as L1-L4) data-analysis semantic hierarchy specifically designed to be operationalizable in real-world tools. In some embodiments, the DASH tool utilizes this semantic hierarchy to create a fluid data analysis experience where text and charts are both first-class concepts, each leveraging their own strengths. Higher levels refer to higher-level semantic abstraction and knowledge integration. The "~Text" on Level 1 modality indicates that text is often used to present individual data values but is typically not used for larger scale data presentation.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above. In some embodiments, a subset of the programs, modules, and/or data stored in the memory 206 is stored on and/or executed by a server system 300.

Although FIG. 2 shows a computing device 200, FIG. 2 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to the computing device 200 may be stored or executed on a server system 300.

Figure 3:
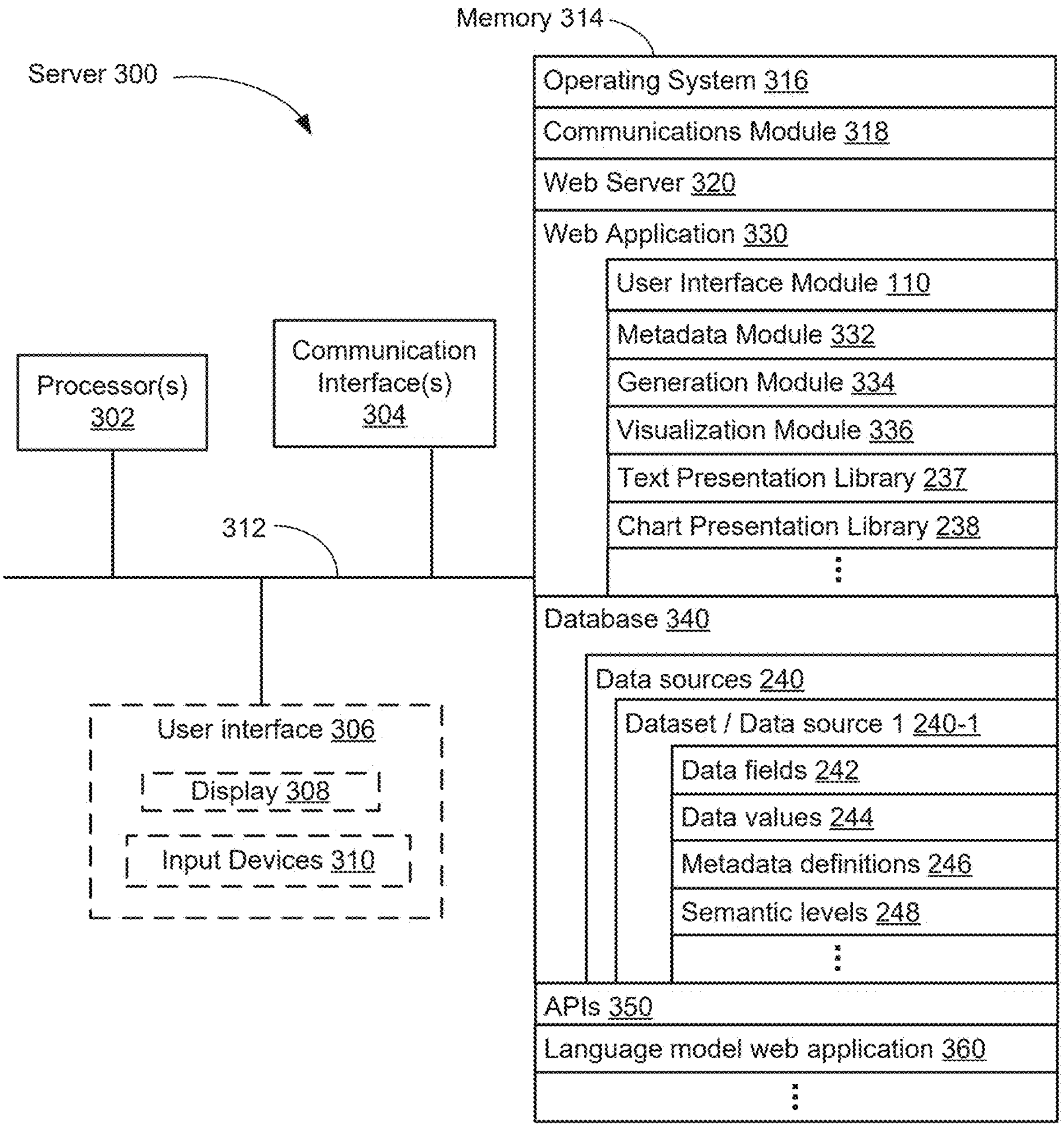
FIG. 3 provides a block diagram of a server system, in accordance with some embodiments.

FIG. 3 is a block diagram of a server system 300, in accordance with some embodiments. The server system 300 typically includes one or more processing units/cores (CPUs) 302, one or more network interfaces 304, memory 314, and one or more communication buses 312 for interconnecting these components. In some embodiments, the server system 300 includes a user interface 306, which includes a display 308 and one or more input devices 310, such as a keyboard and a mouse. In some embodiments, the communication buses 312 include circuitry (sometimes called a chipset) that interconnects and controls communications between system components.

In some embodiments, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPUs 302. The memory 314, or alternatively the non-volatile memory devices within the memory 314, comprises a non-transitory computer readable storage medium.

In some embodiments, the memory 314 or the computer readable storage medium of the memory 314 stores the following programs, modules, and data structures, or a subset thereof:

- an operating system 316, which includes procedures for handling various basic system services and for performing hardware dependent tasks;
- a network communications module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a web application 330 (e.g., DASH web application), which may be downloaded and executed by a web browser 226 on a user's computing device 200. In general, a web application 330 has the same functionality as a desktop application 230, but provides the flexibility of access from any device at any location with network connectivity, and does not require installation and maintenance. In some embodiments, the web application 330 includes various software modules to perform certain tasks, such as:
  - a user interface module 110, which provides the user interface for all aspects of the web application 330;
  - a metadata module 332, which has the same functionalities as metadata component 232;
  - a generation module 334, which has the same functionalities as generation component 234;
  - a display module 336, which has the same functionalities as display component 236;
  - a text presentation library 237 (e.g., Slate.JS) that maintains text-associated DASH metadata and renders the text appropriately; and
  - a chart presentation library 238 (e.g., Chart.JS)

In some embodiments, the server system 300 includes a database 340. In some embodiments, the database 340 includes zero or more datasets or data sources 240, which are used by the web application 330 and/or the language model web application 360. In some embodiments, the datasets/data sources 240 include a first dataset or a first data source (e.g., dataset/Data source 1 240-1). An example dataset is data for Seattle real estate, cleaned and aggregated to the zip code level. In some embodiments, a respective dataset or data source 240 includes data fields 242, data values 244 corresponding to the data fields, metadata definitions 246, and semantic levels 248.

In some embodiments, the memory stores APIs 350 for receiving API calls from one or more applications (e.g., a web server 320, a web application 330, and/or a language model web application 360), translating the API calls into appropriate actions, and performing one or more actions.

In some embodiments, the memory 314 stores a language model web application 360 that executes one or more LLMs.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some embodiments, the functionality and/or data may be allocated between a computing device 200 and one or more servers 300. Furthermore, one of skill in the art recognizes that FIG. 3 need not represent a single physical device. In some embodiments, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

An exemplary prototype version of DASH tool is initialized with (i) a dataset consisting of Seattle real estate data cleaned and aggregated to the zip code level, (ii) a natural language (NL) description of the dataset, (iii) a NL description of the analytical end goal (e.g., to find a home for a family of four), and (iv) a description of the DASH metadata format and instructions on how to assign the different semantic levels to the LLM's response text.

FIG. 4 shows an example of interactivity with generated text paragraphs (Px) (e.g., labels P1, P2, and P3 and interactions (Ix) (e.g., labels I1, I2, I3, I4, and I5) on the DASH user interface (e.g., user interface 110), in accordance with some embodiments. In this example, DASH presents an initial paragraph (P1) discussing a Seattle real estate dataset through the lens of a real estate agent looking for a good neighborhood for a family of four. A user drags the words "house and lot sizes" to the Tell Me More button (I1). DASH's LLM then generates a new high-level explanation of why those attributes are important for their analytical goal (P2). The user then drags the phrase "affordable option" (whose metadata contains the 'avg_price' field) to the Show Me More button (I2). DASH generates the figure "Average House Price" and a figure reference is inserted into the text. The user then drags the words "98101" and "98105, 98112, and 98117" into the "Average House Price" figure (I3 and I4), highlighting those zip codes. The text "bedrooms and bathrooms" is then dragged to Show Me More (I5), triggering DASH to create a new scatter plot "Average Number of Bedrooms by Average Number of Bathrooms". Figure references are re-numbered by order of appearance in the text. Looking at the house price bar chart, the user wonders why zip code 98112 is so expensive, so they drag the "98112" bar from the bar chart to the scatter plot (I6), highlighting "98112" in the upper right of the scatter plot. Looking for a higher-level analysis of what this position means, the user drags the "98112" mark to Tell Me More (I7), whereupon the DASH LLM generates text (P3) explaining that that zip code has high-end but expensive homes. The end result of this interaction is a custom bimodal dashboard tailored for a specific analytical end goal, where high-level analysis and low-level data presentation are linked together.

The LLM produces the final narrative text formatted in a tree-like hierarchy where each node in the tree contains metadata concerning semantic level ('Layer' in the code) and associated data fields and values (FIG. 1, Panel C). This tree structure maintains the text organization (Paragraph→Sentence→Sentence Leaf) and is necessary for consumption by the text rendering component. The text rendering component provides rendering callbacks to format the text based on the text's metadata. The LLM response-text is shown in panel E of FIG. 1. In some embodiments, the response text is formatted with color-coded semantic levels (e.g., L1 corresponds to the color pink, L2 corresponds to the color green, L3 corresponds to the color yellow, and L4 corresponds to the color blue.

When text is dragged from either the text or chart components of the DASH interface, the computing device 200 recovers the text's underlying metadata from the component. While text is assigned a semantic level by the LLM, chart data in this prototype are assigned to Semantic Level 2 (L2) because of the charts' data-specific nature. More expressive charts could comprise L3 data. From these data, whether sourced from text or chart, the drag-and-drop JSON object shown in FIG. 1 panel D is constructed and stored in memory (e.g., memory 206 or memory 314). Once there, it can be dropped anywhere within DASH, independent of where it came from; this feature supports DASH's bidirectional data flow.

FIG. 4 illustrates that in some embodiments, the user interface 110 includes a "Tell Me More" affordance 402 and a "Show Me More" affordance 404. Each of the affordances can also be referred to as a user-selectable element or icon, a user interface element, an interactive element, or a user-selectable option. In some embodiments, the user interface 110 can display one or more charts, such as chart 406 and chart 408. In some embodiments, the user interface 110 can display one or more paragraphs of text 410.

In some embodiments, the "Tell Me More" affordance 402 and the "Show Me More" affordance 404, and charts 406 and 408 are capable of receiving an object (e.g., a JSON object) above via mouse drag-and-drop. When this happens, the "Show Me More" affordance 404 creates a new chart with the metadata from the dropped JSON object. This metadata details the data fields and values to be charted. Similar to chart-generation algorithms like Polaris and ShowMe, one field produces a bar chart, two fields produce a scatter plot, specific data values produce reference lines, and specific zip codes highlight the indicated mark. If the JSON object is dropped directly onto an existing chart, the existing chart is updated in the same manner, possibly upgrading a bar chart to a scatter plot if a new field is added.

In some embodiments, when the drag-and-drop JSON object is dropped on the "Tell Me More" affordance 402, DASH re-queries the LLM, asking for further discussion about the fields and values detailed in the JSON object.

In some embodiments, to produce the natural mixed semantic-level narrative style described by Lundgard and Satyanarayan, DASH produces semantically complementary follow-up responses by offering high-level (e.g., L3 and L4) analytical responses to low-level (e.g., L1 and L2) data observations, and low-level data-centric responses to high-level observations. As shown in FIG. 4, this semantic-level-aware, source-agnostic data flow facilitates an intuitive data exploration between DASH's components, including text-to-text, text-to-chart, chart-to-text, and chart-to-chart interactivity.

Figure 5A:
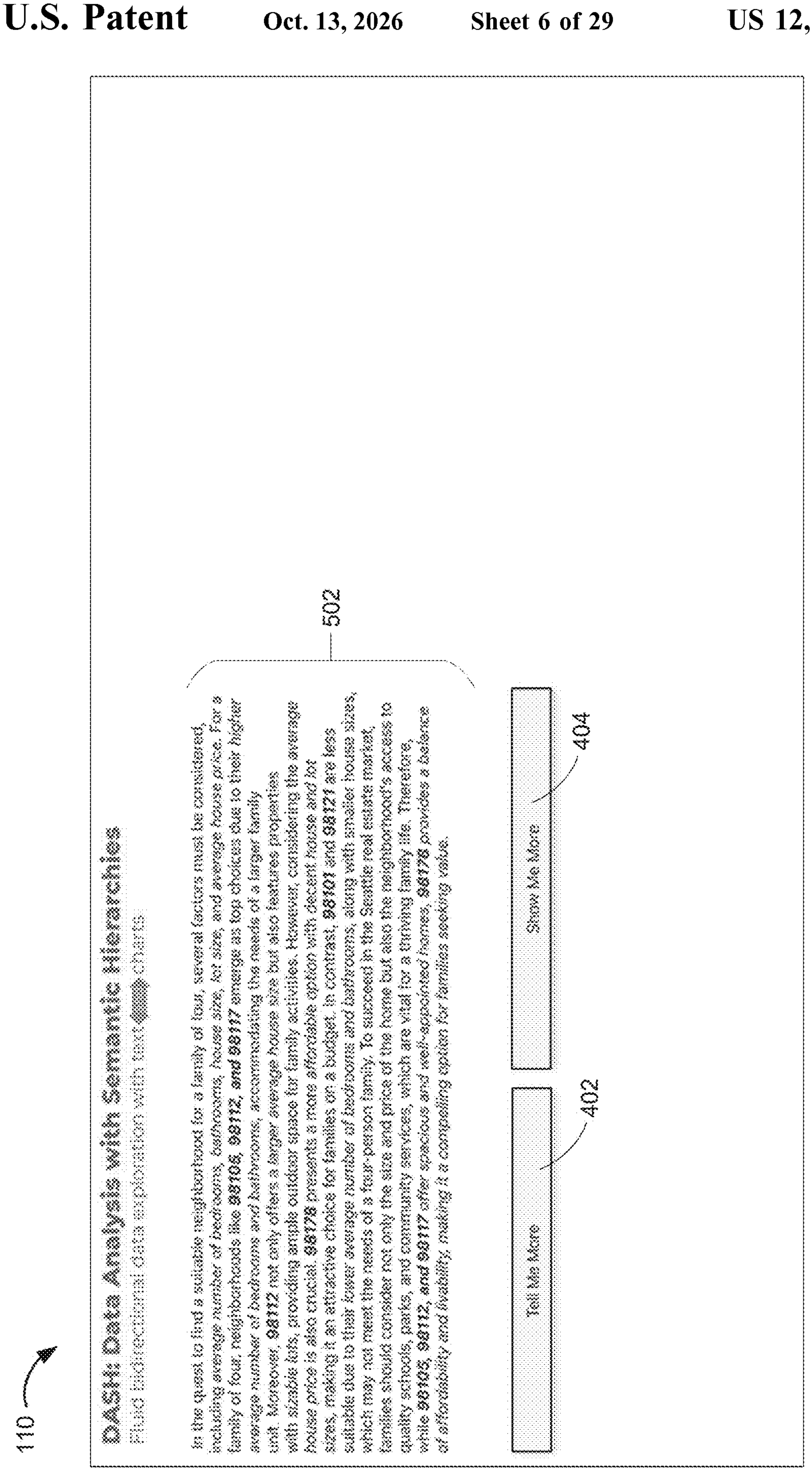
FIGS. 5A to 5S provide a series of screenshots illustrating user interactions with the DASH interface, in accordance with some embodiments.
Figure 5B:
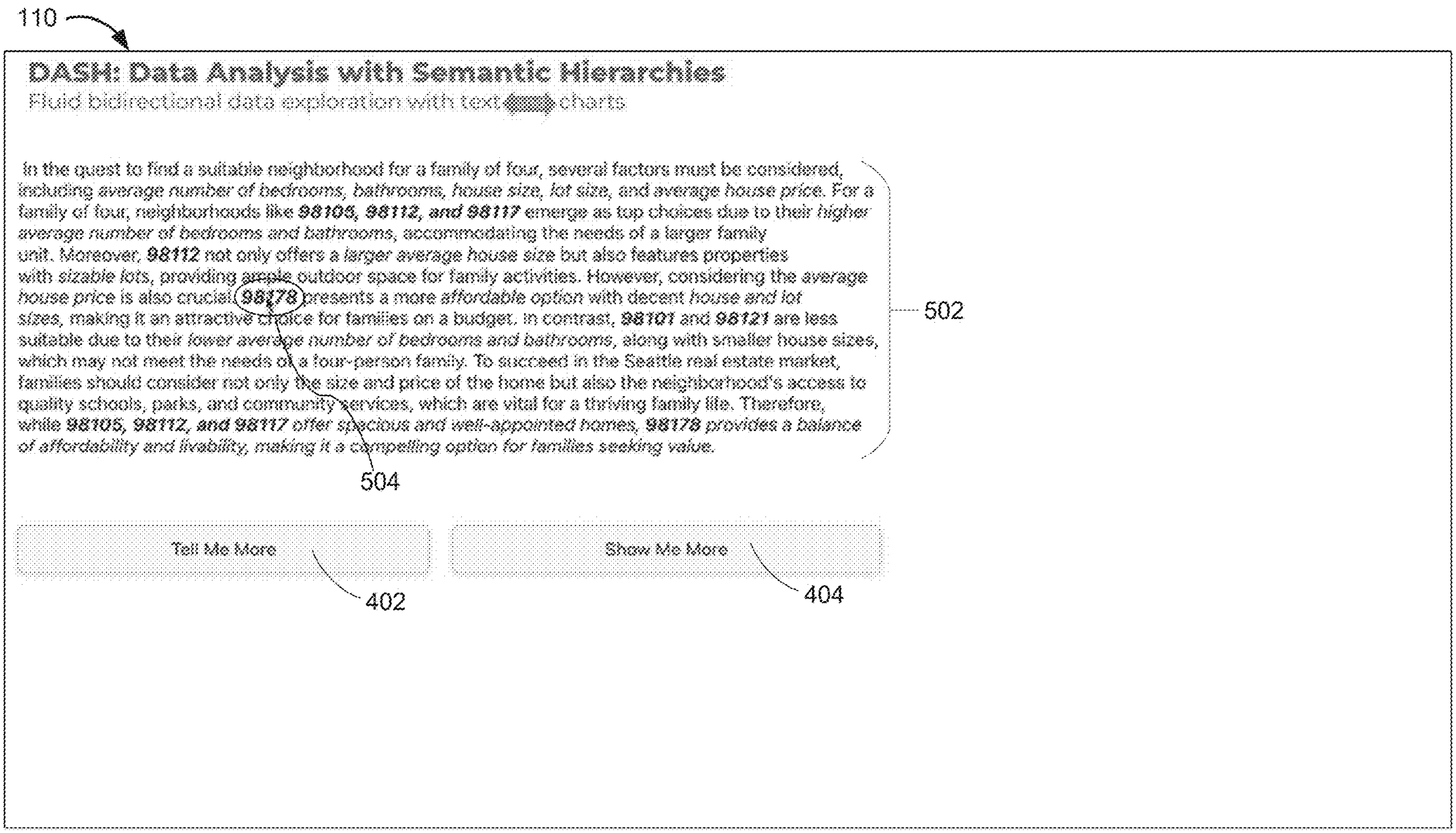
Figure 5C:
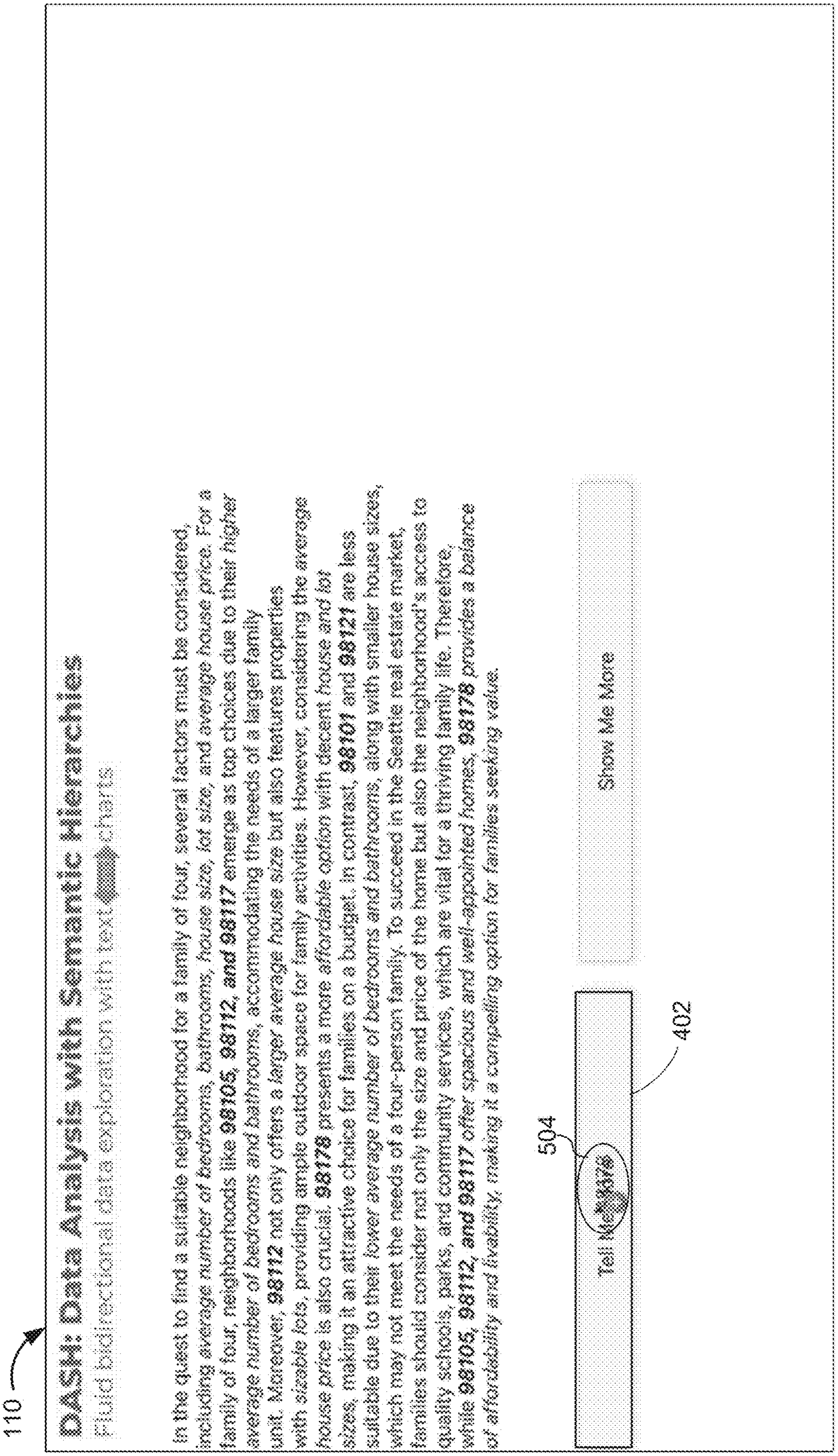
Figure 5D:
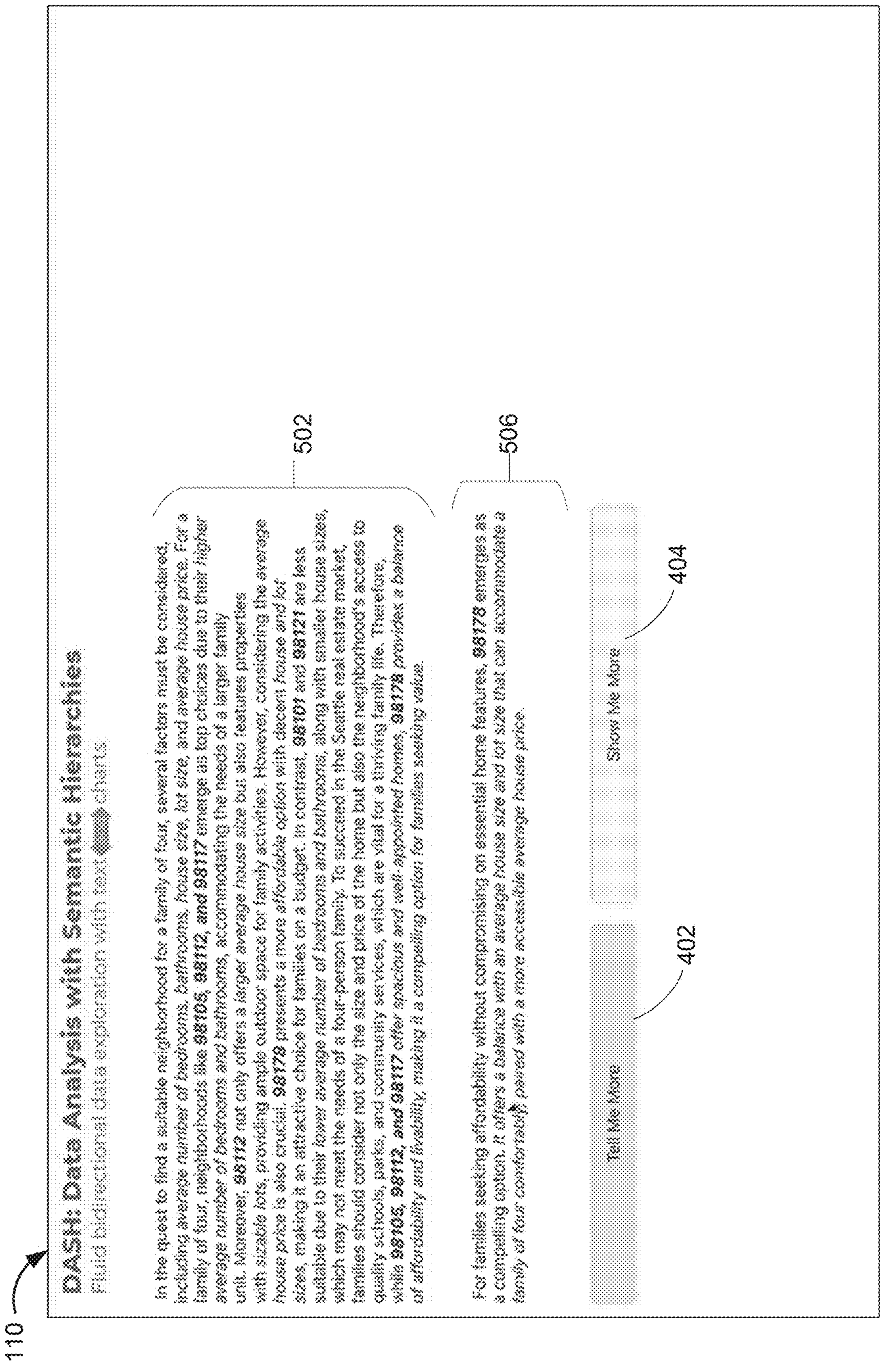
Figure 5E:
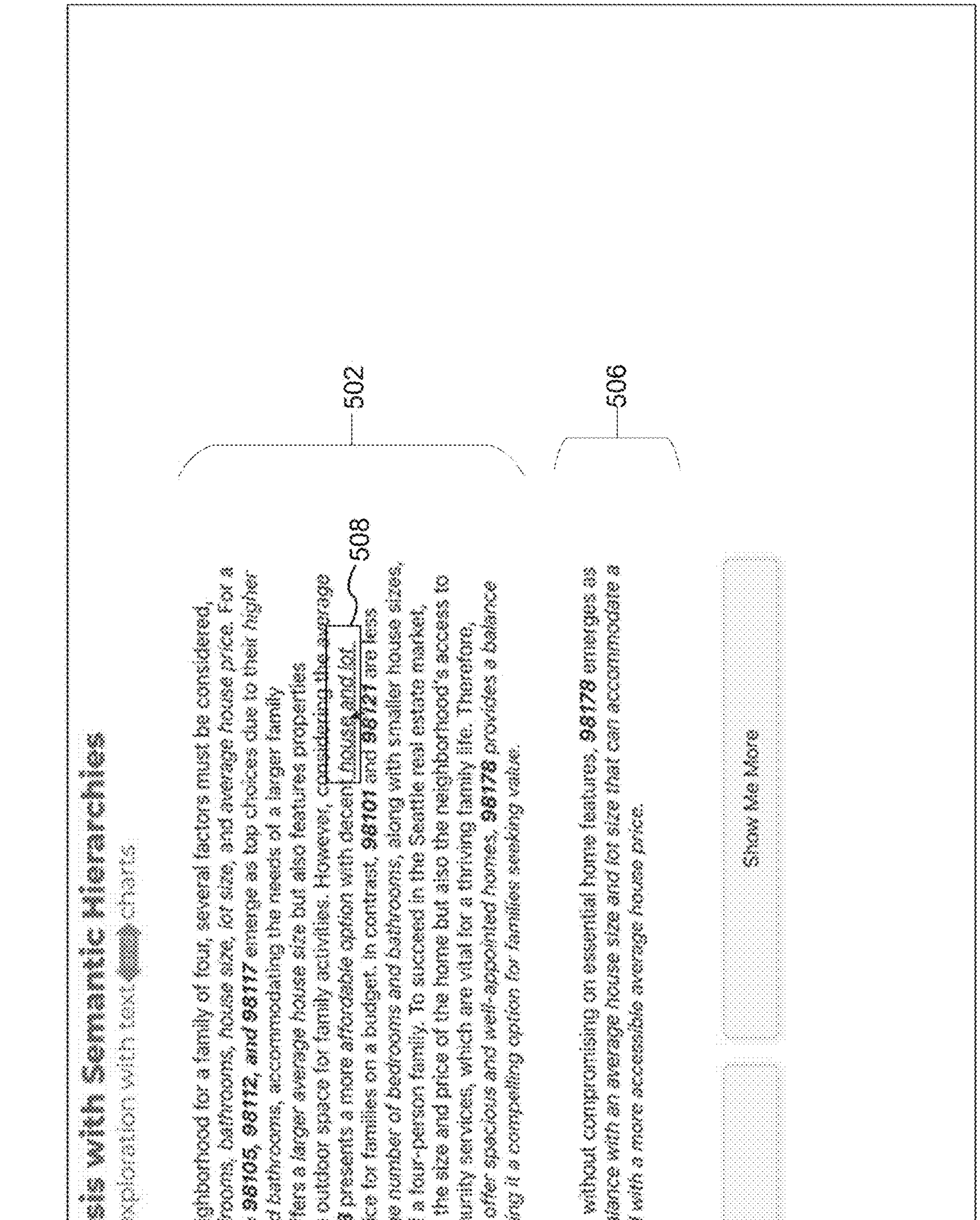
Figure 5F:
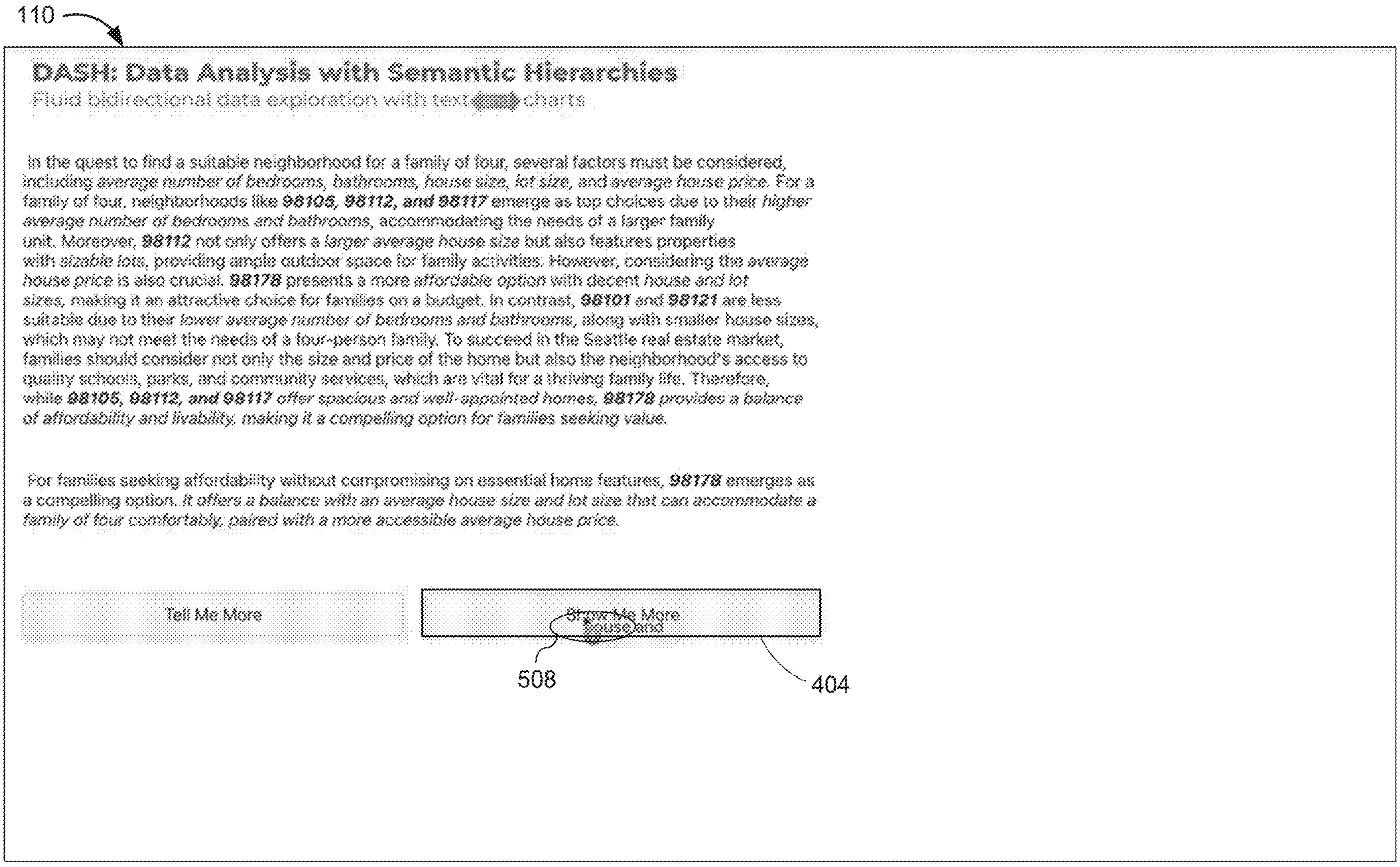
Figure 5G:
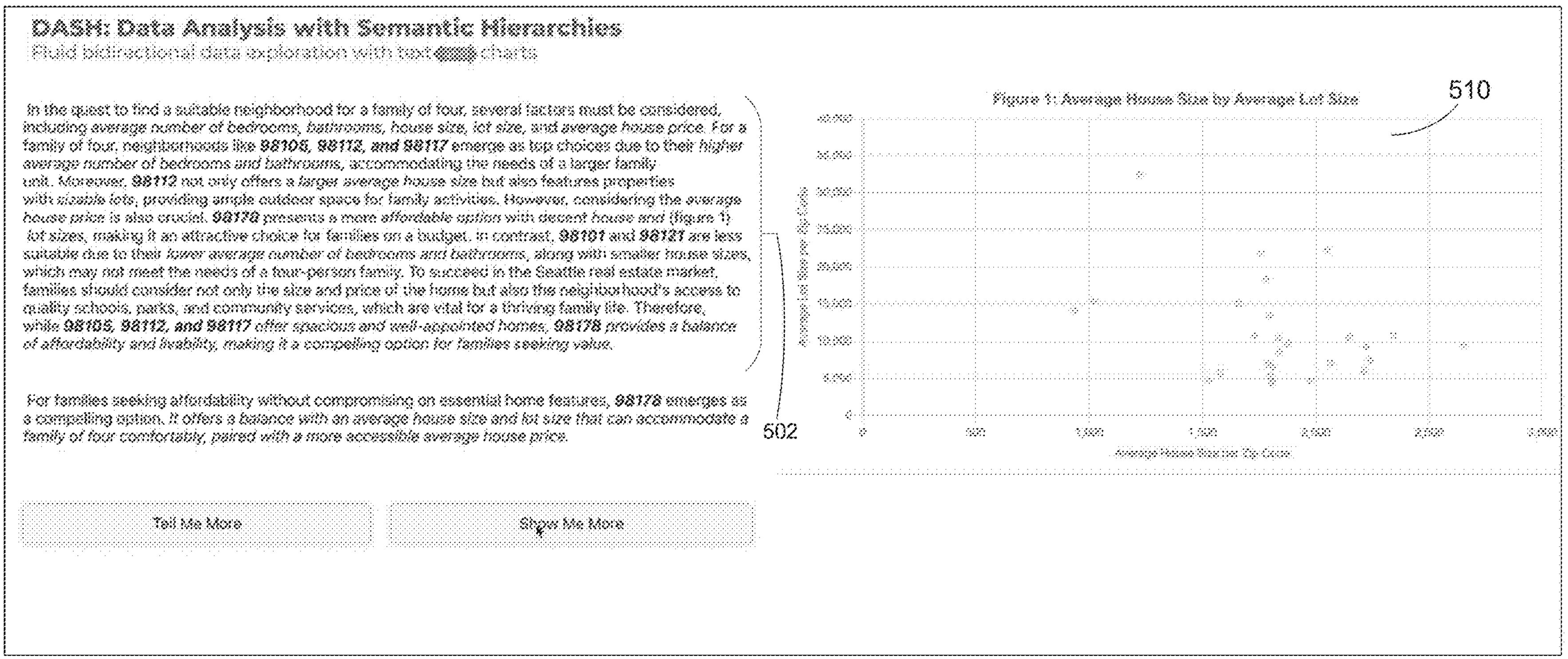
Figure 5H:
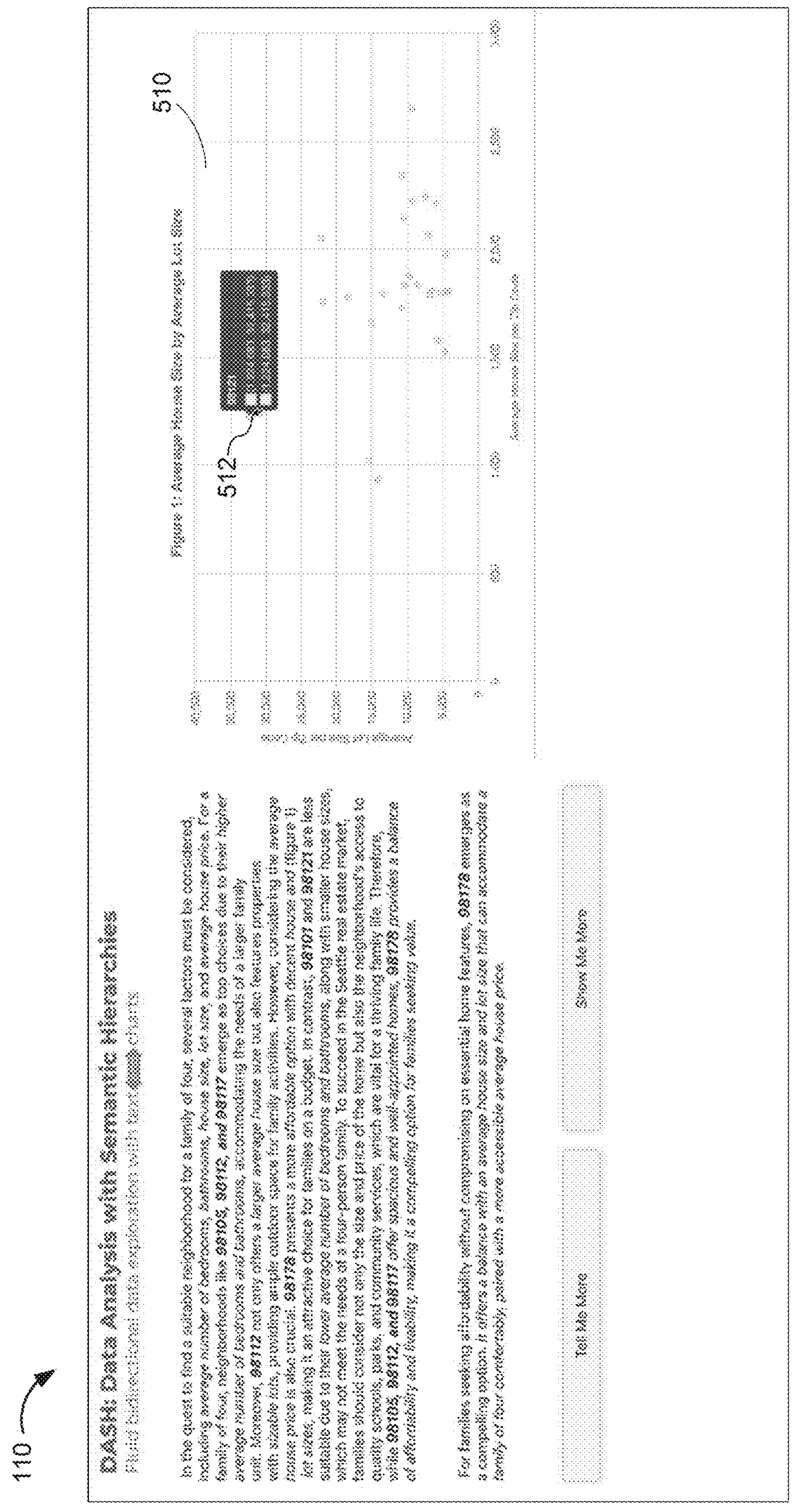
Figure 5I:
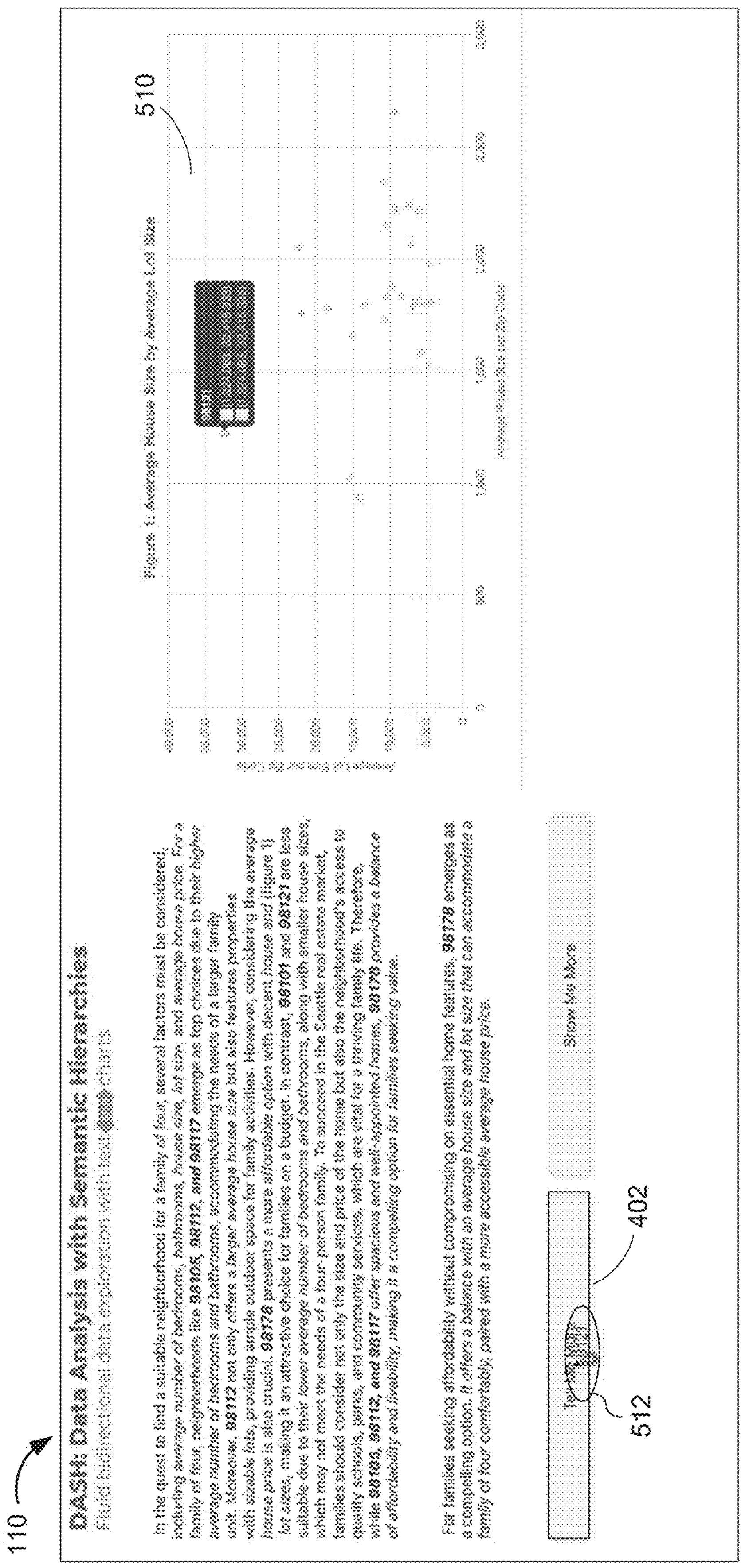
Figure 5J:
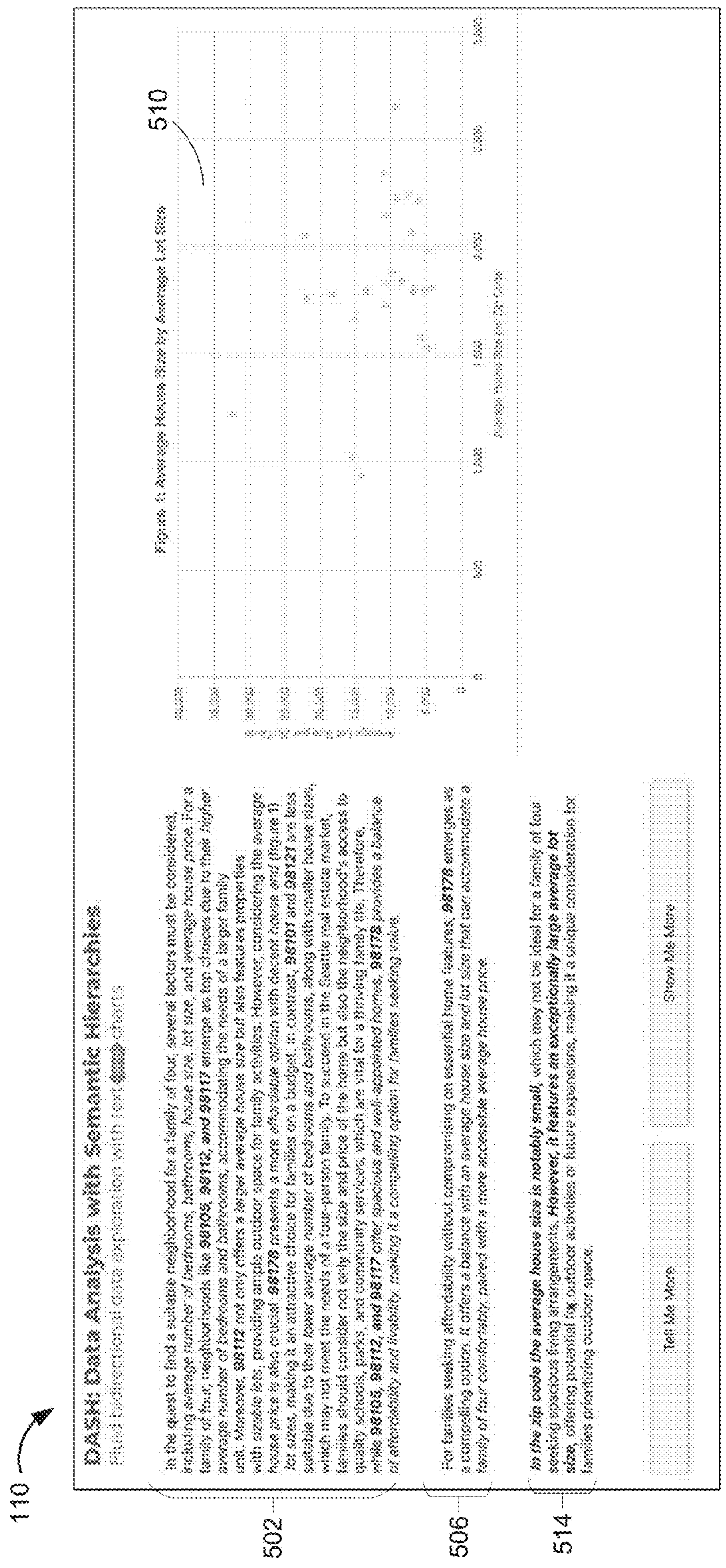
Figure 5K:
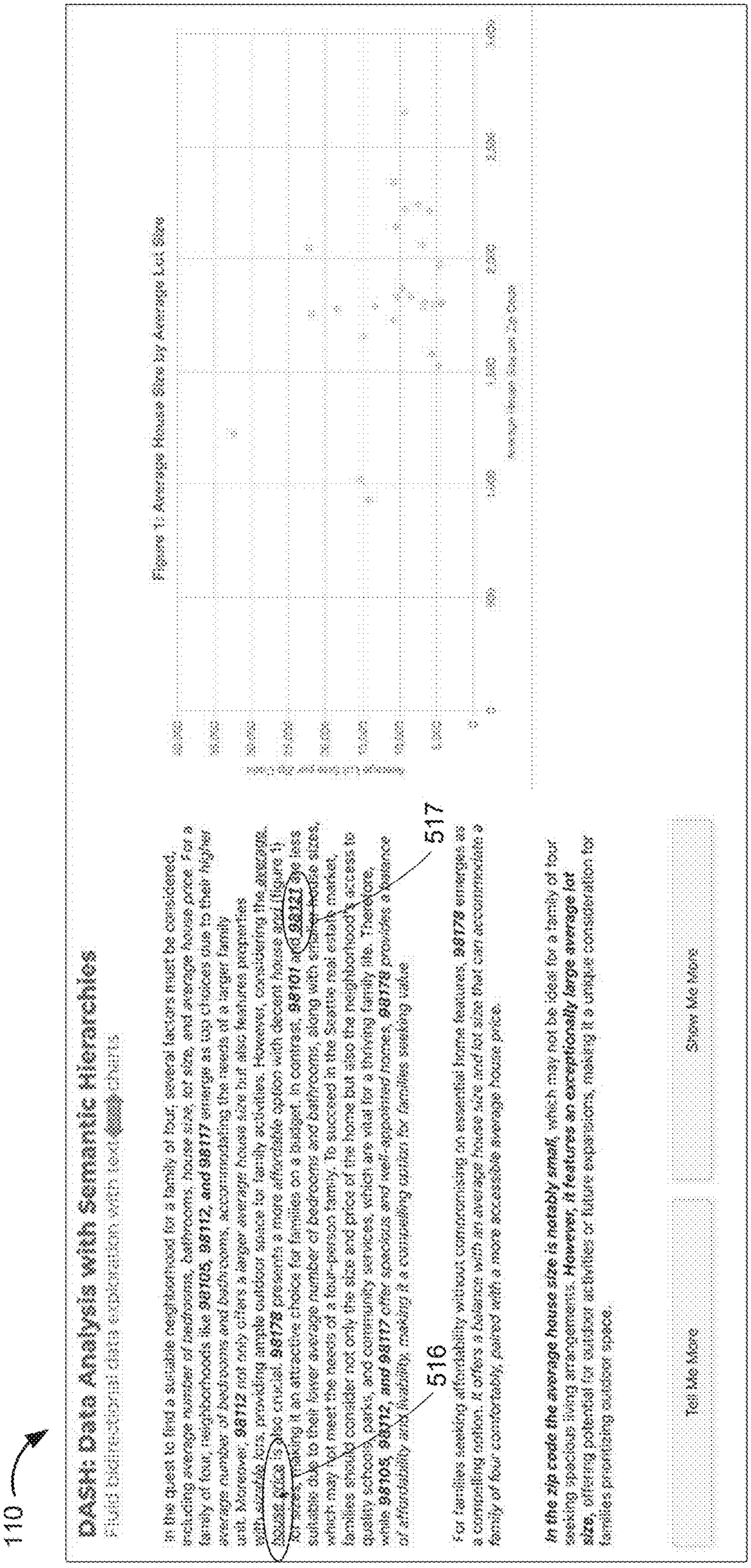
Figure 5L:
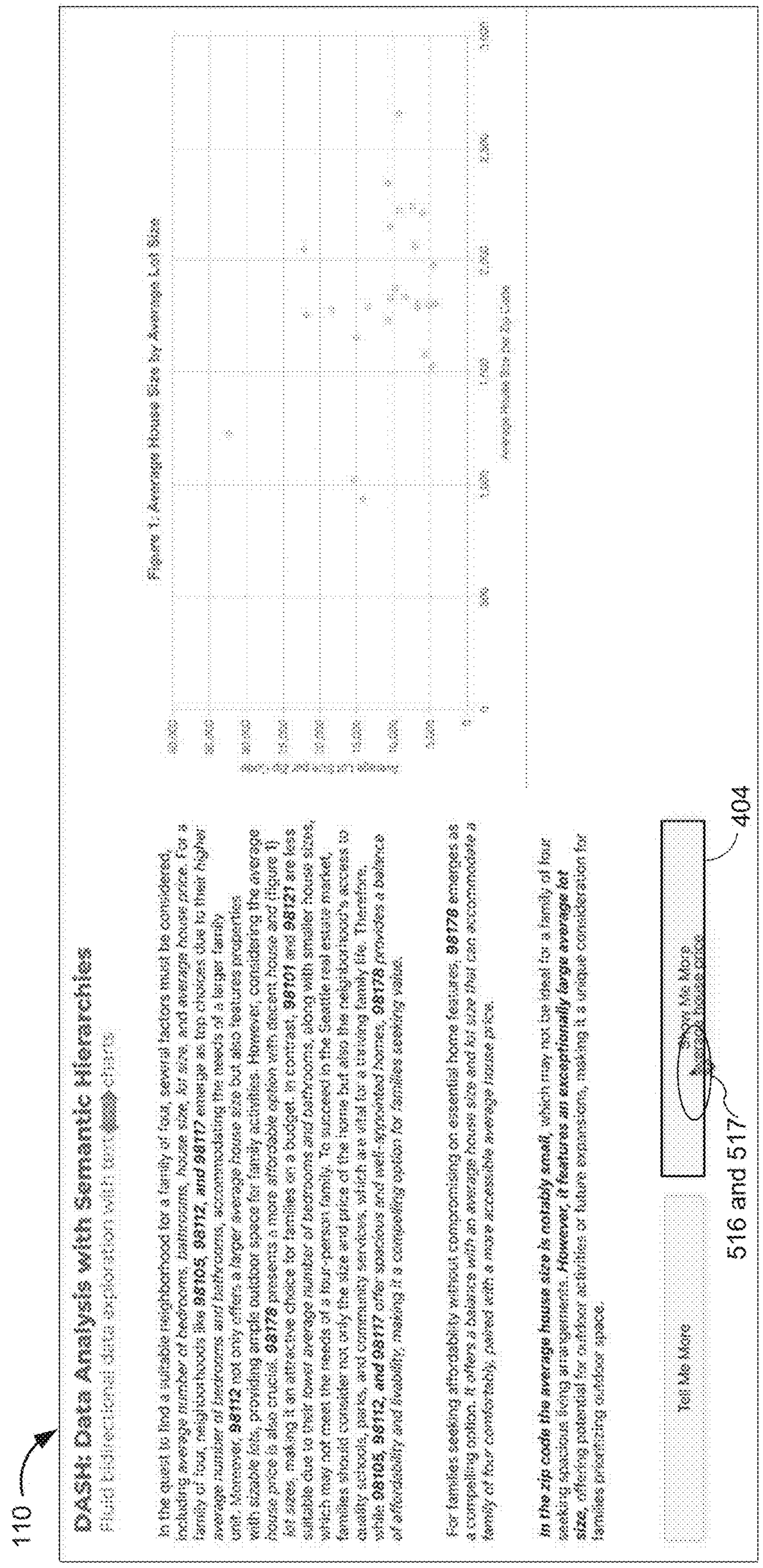
Figure 5M:
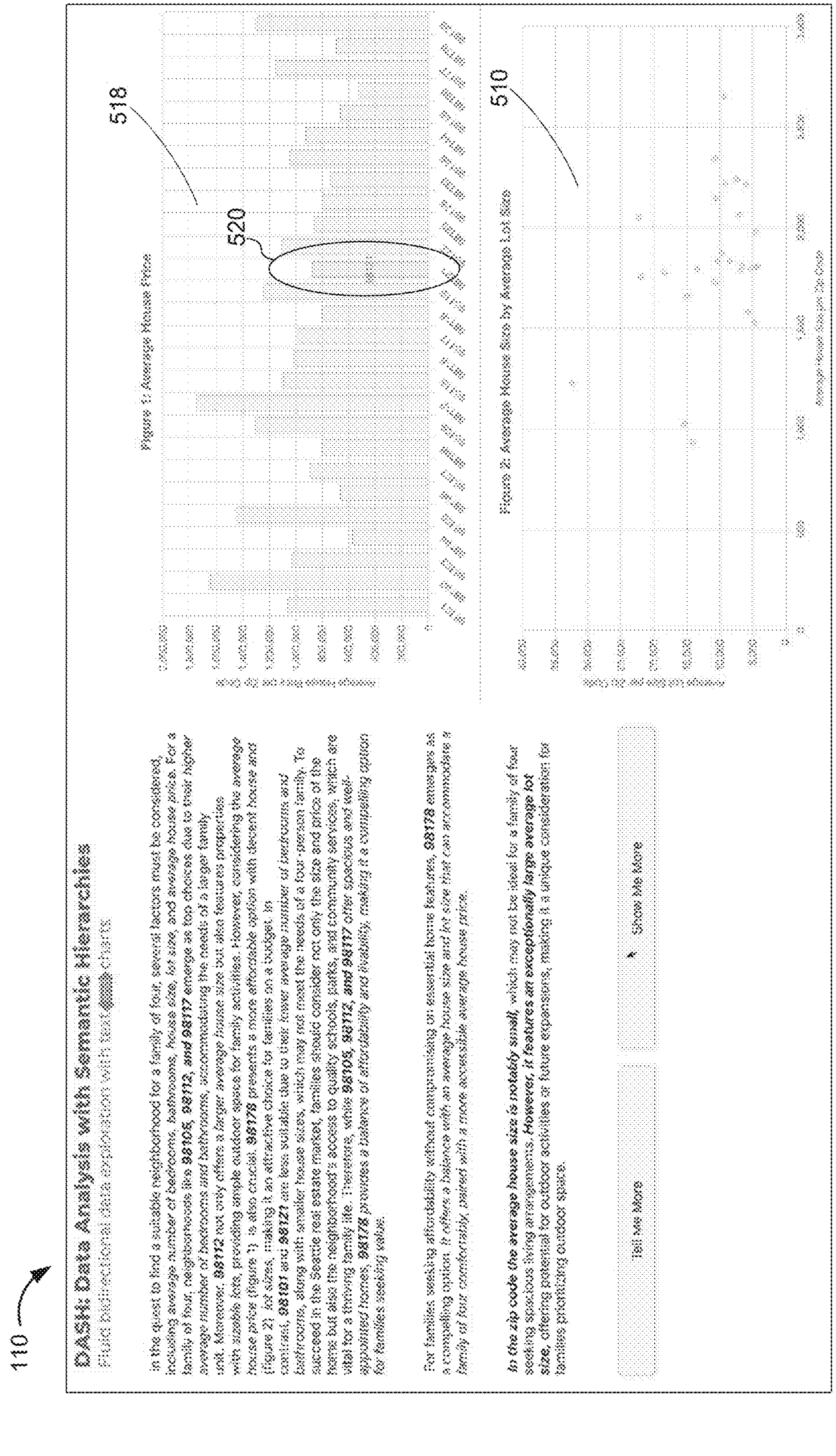
Figure 5N:
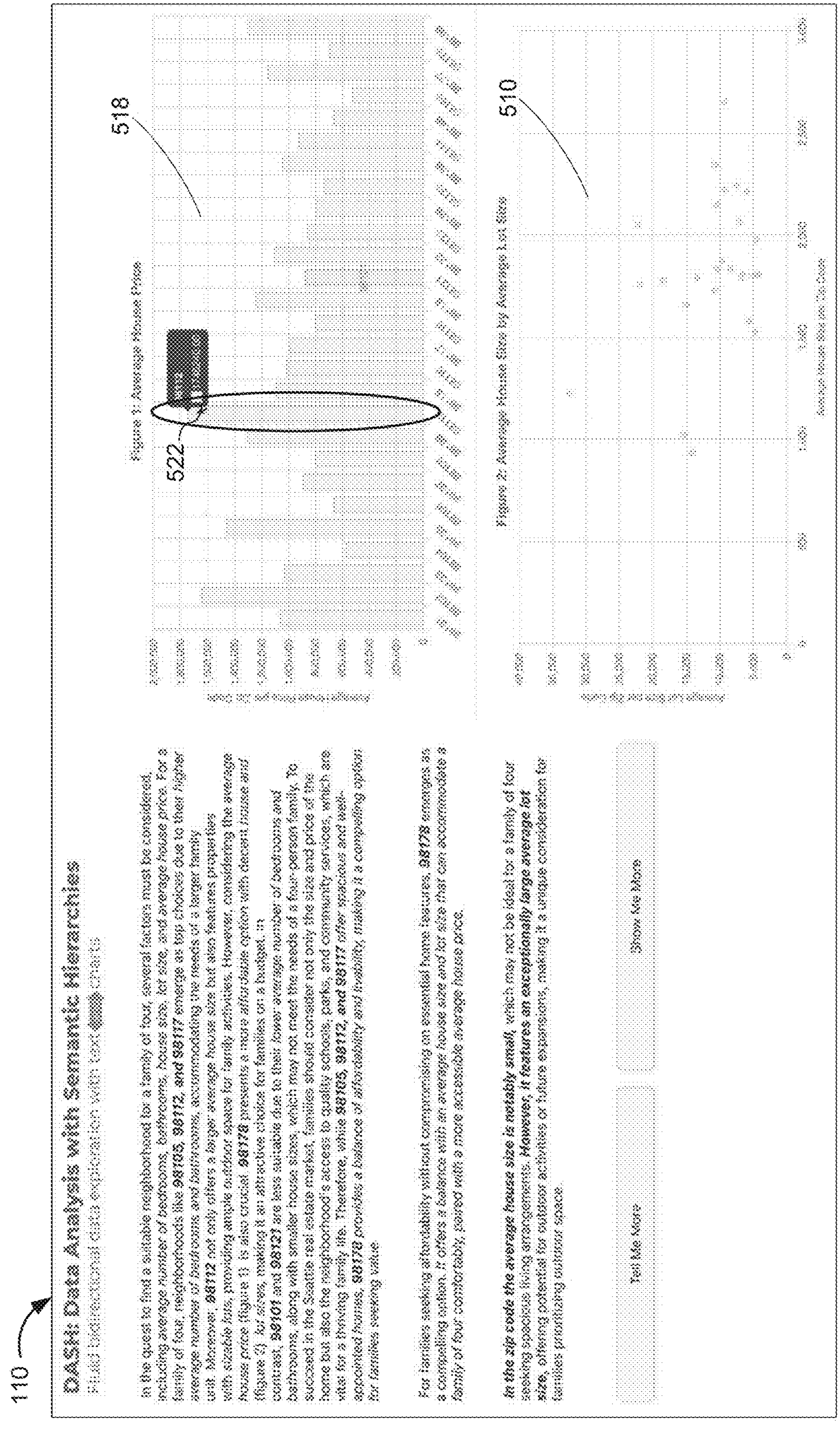
Figure 5O:
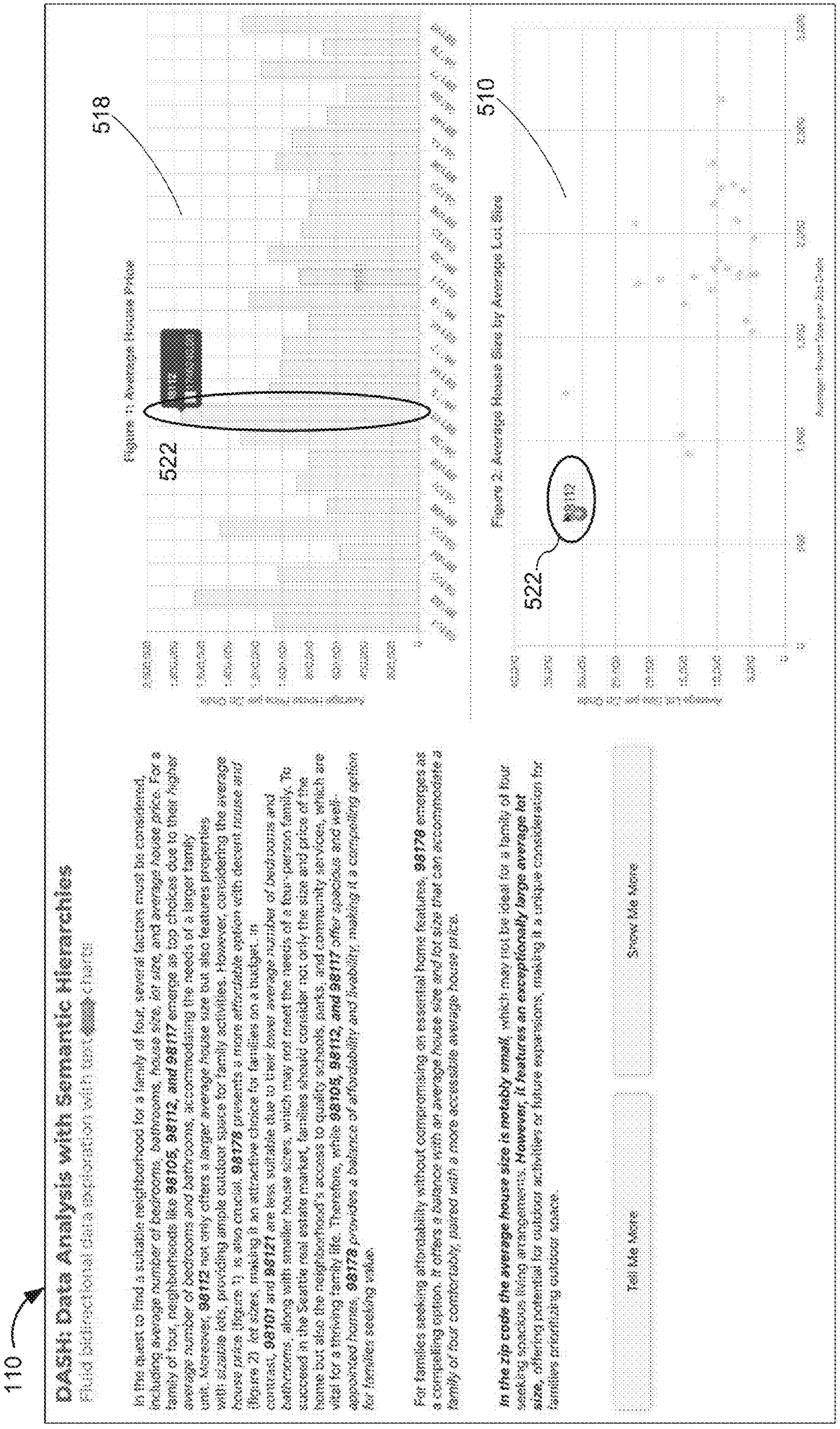
Figure 5P:
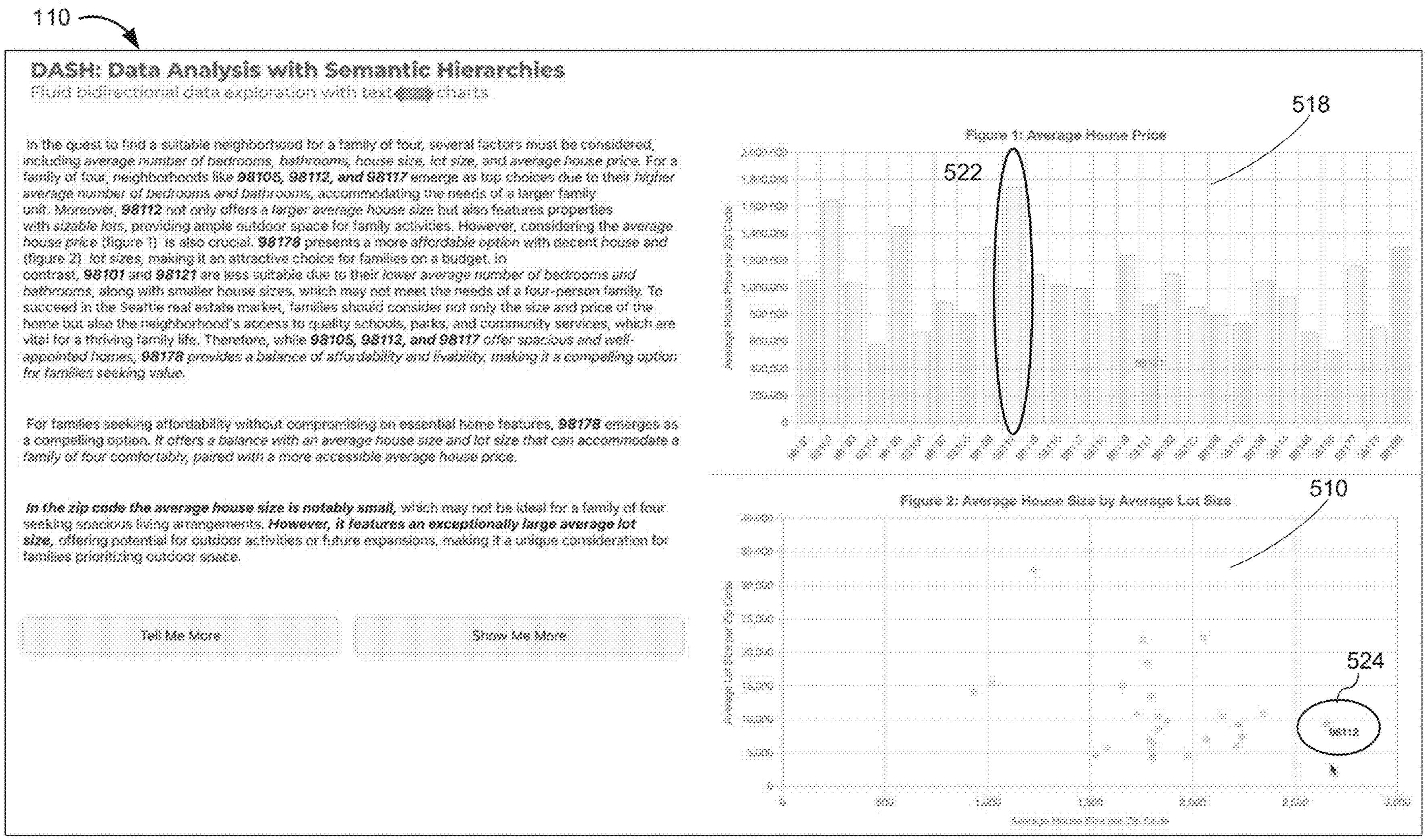
Figure 5Q:
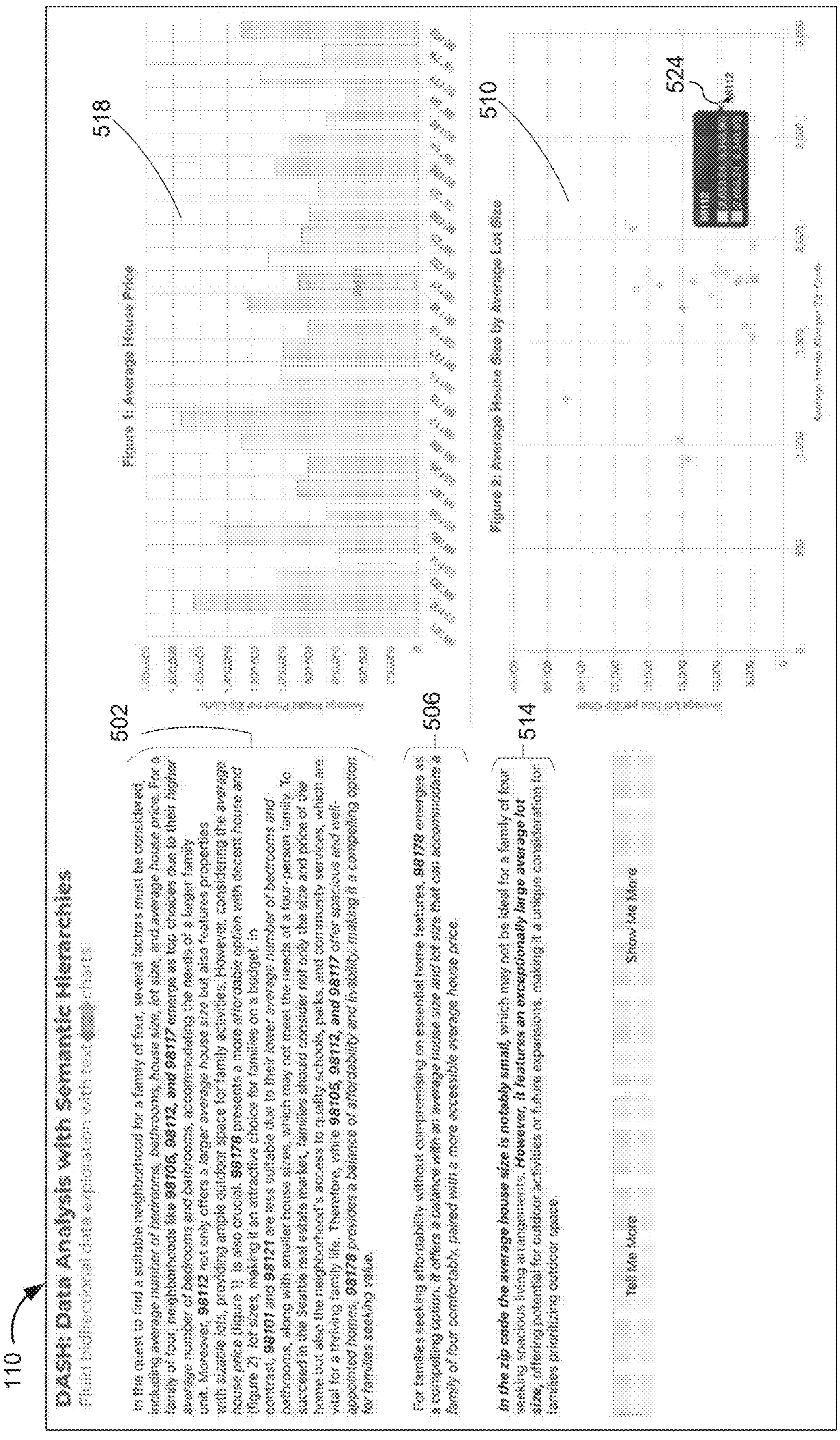
Figure 5R:
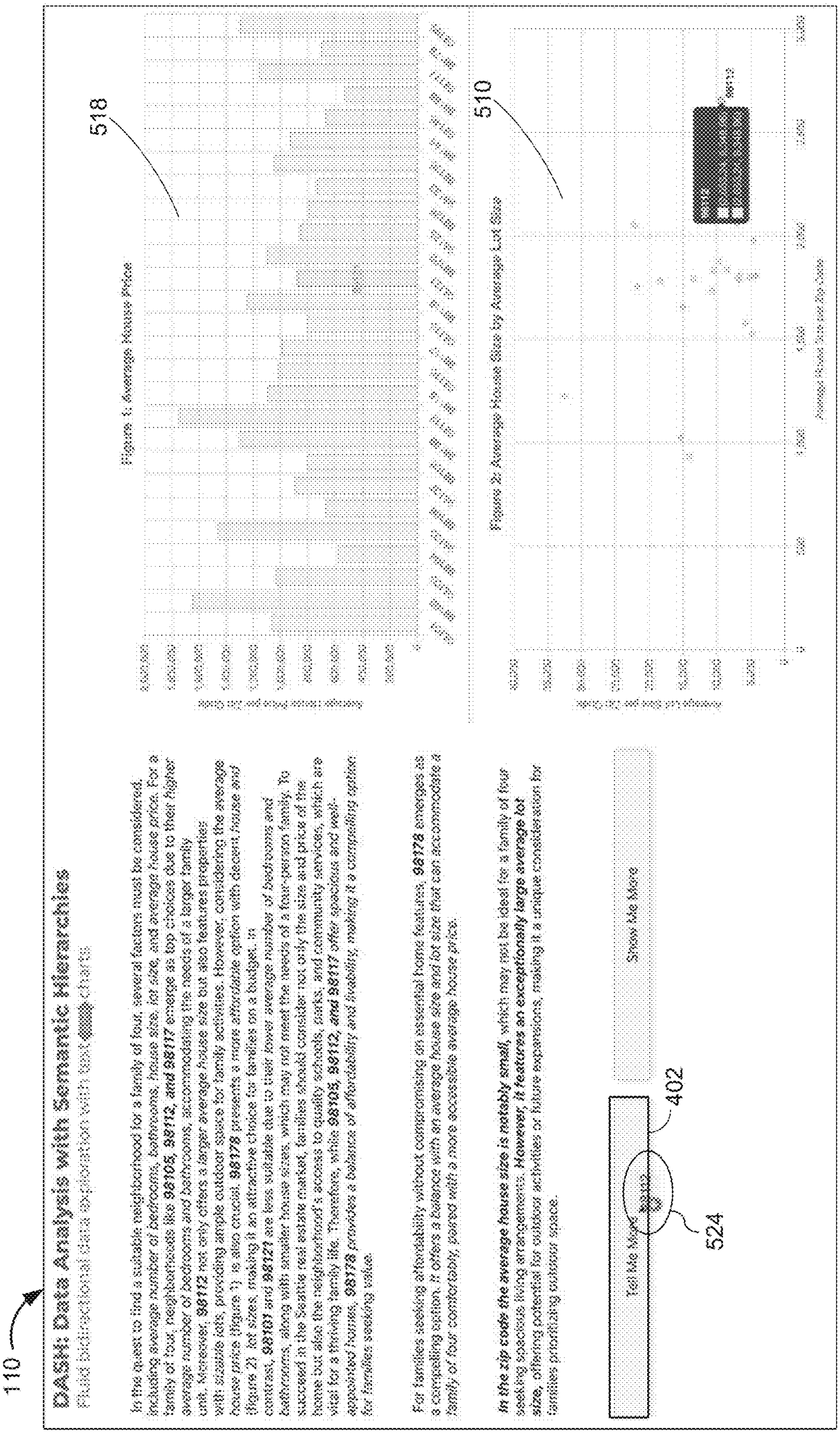
Figure 5S:
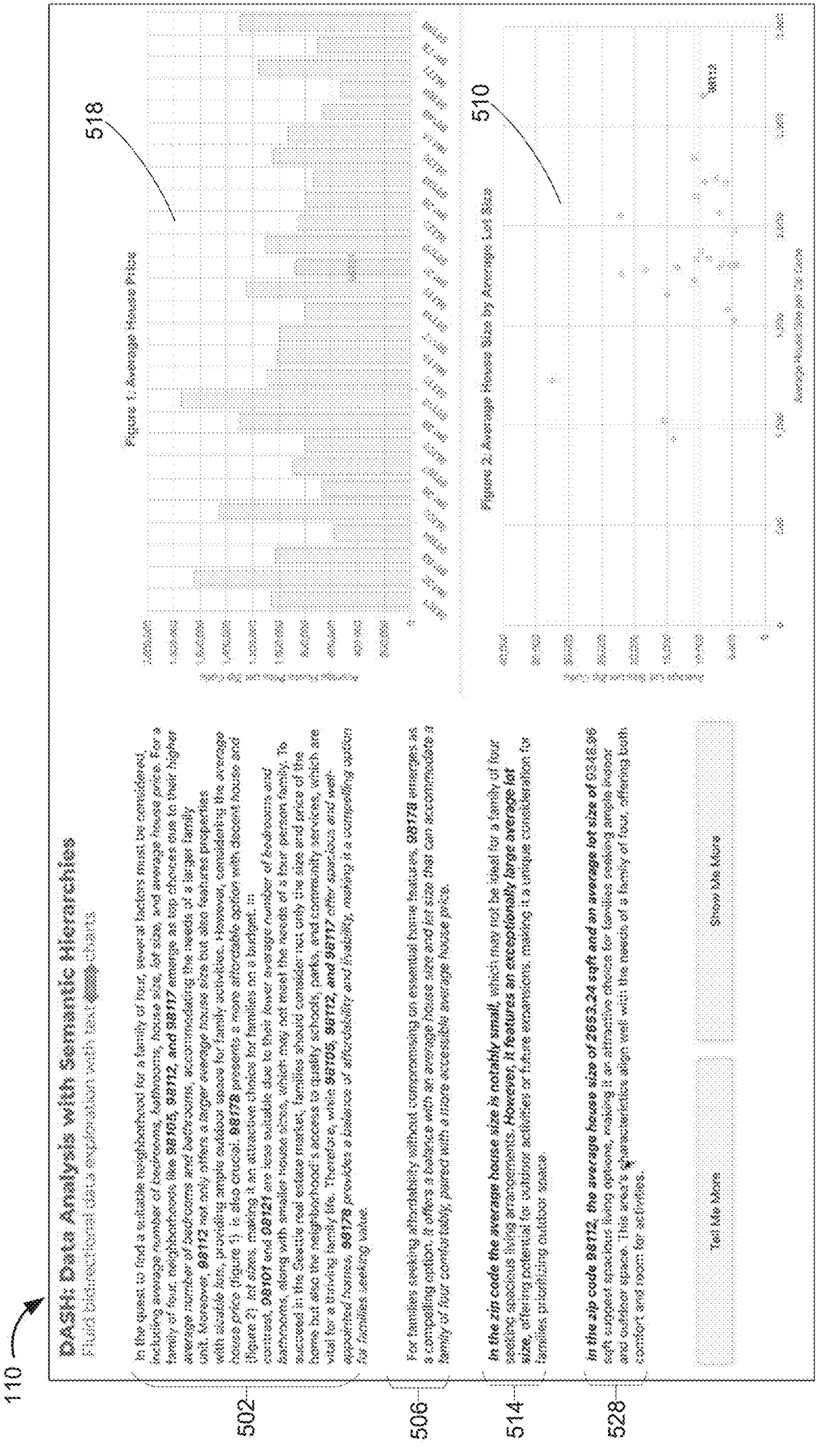

FIGS. 5A to 5S provide a series of screenshots illustrating user interactions with the DASH interface 110, in accordance with some embodiments.

According to some embodiments of the present disclosure, the DASH tool/interface (e.g., application 230 or web application 330) enables fluid interactions between text and charts. The DASH tool/interface embeds the concept of low-level and high-level analyses. For example, charts tend to provide relatively low-level analysis of specific data, whereas text comprises both low- and relatively high-level data analysis.

In FIG. 5A, the user interface 110 displays an LLM-generated textual description 502 describing the Seattle real estate market. In some embodiments, an LLM generates the text description 502 according to input information about Seattle real estate data, semantic data about the data, information about a user's goal, and information about how to encode the data. For example, the LLM (e.g., language model application 260 or language model web application 360) can be provided with information such as a dataset of Seattle real estate data cleaned and aggregated to the zip code level, a natural language (NL) description of the dataset, a natural language description of the analytical end goal (e.g., to find a home for a family of four), and a description of the metadata format and instructions on how to assign the different semantic levels to the LLM's response text. The generated text description 502 contains metadata behind it, which links to fields and specific values.

FIG. 5B to 5D illustrate text-to-text drill-in, in accordance with some embodiments. FIG. 5B illustrates user selection of metadata-encoded text 504 corresponding to zip code "98178." The transition from FIG. 5B to FIG. 5C shows a user drag and drop action of the metadata-encoded text 504 (e.g., corresponding to zip code "98178") from the main paragraph onto the "Tell me More" affordance 402. FIG. 5D shows that in response to the user interaction, the LLM (e.g., language model application 260 or language model web application 360) generates a text description 506 analyzing zip code 98178 in the context of Seattle housing and displays the text description 506 on the user interface 110. The text description 506 includes additional text information generated by the LLM with respect to seeking affordability. Specifically, this example shows that the LLM is provided with low-level data (e.g., a zip code) and generates a high-level analysis.

FIGS. 5E to 5G illustrate text-to-chart analysis, in accordance with some embodiments. FIG. 5E illustrates user selection of metadata-encoded text 508 "house and lot size" (e.g., metadata-encoded text or a JSON object). The transition from FIG. 5E to FIG. 5E show a user drag and drop action of the text 508 from the LLM-generated paragraph onto the "Show me More" affordance 404. FIG. 5G shows that, in response to the user interaction, the user interface 110 displays a chart 510 (e.g., a scatter plot) (e.g., a data visualization) of average lot size per zip code in the y-axis versus average house size per zip code in the x-axis. In this example, a scatter plot is rendered because the metadata-encoded text 508 specifies two data fields, "house" and "lot size," both of which have been averaged (e.g., aggregated) to the zip code level.

FIGS. 5H to 5J illustrate obtaining a high-level analysis from a low-level data point, in accordance with some embodiments. In FIG. 5H, the user selects a data mark 512, corresponding to zip code 98121, on the chart 510. In FIG. 5I, the user places the data mark 512 onto the "Tell me More" affordance 402. FIG. 5J shows that, in response to the user interaction, the LLM generates and displays, on the user interface 110, additional text description 514 that describes the zip code 98121 in the context of the goal of finding a home for a family of four.

FIGS. 5K and 5L illustrate user interactions that include selecting metadata-encoded text 516 ("average house price") (e.g., a JSON object) and metadata-encoded text 517 (zip code "98121") (e.g., a JSON object), and dragging and placing these metadata-encoded texts over the "show me more" affordance 404. FIG. 5M shows that, in response to this interaction, DASH generates a chart 518 and displays it on the user interface 110 alongside the chart 510 and the LLM-generated text. The chart 518 corresponds to a bar chart. Each data bar in the chart 518 represents a respective zip code, and the length (e.g., height) of the data bar represents the average house price of that zip code. In this example, a bar chart is rendered because only one data field "house price" (e.g., aggregated to the zip code level) has been selected. In this example, "zip code" is not considered a distinct data field in this example because all the data fields in the dataset have been aggregated to the zip code level. In the chart 518, the visually emphasized data bar 520 (e.g., a data mark) corresponds to the zip code "98121" that was selected by the user and placed over the affordance 404 (as shown in FIGS. 5K and 5L).

In some embodiments, DASH can perform chart-to-chart analysis. FIGS. 5N, 5O, and 5P illustrate. In FIG. 5N, a user selects a data mark 522 (e.g., a data bar) of the chart 518. The data mark 522 corresponds to the average house price for zip code 98112. As shown in chart 518, the average house price for zip code 98112 is the highest amongst the zip codes in that chart. In FIG. 5O, the user places the data mark 522 on the chart 510. FIG. 5P shows that in response to user placement of the data mark 522 on the chart 510, the chart 510 visually highlights a data mark 524 on the chart 510, corresponding to the zip code "98112." Based on this analysis, a user can infer that a reason why the house prices in zip code 98112 is expensive is because it has the largest average house size amongst the zip codes.

FIGS. 5Q and 5R illustrate user selection of the data mark 524, and placement of the data mark 524 (e.g., by a drag-and-drop action) over the "Tell Me more" affordance 402. This user interaction causes DASH to generate a high-level text analysis through the lens of the data mark. For example, FIG. 5S shows that in response to the user interaction, DASH generates a text description 528 that provides specific low-level details like the area of the house size, lot size (square feet) for the zip code 98112. The text description also includes a high level insight as to how well houses and lot sizes in the zip code 98112 align with the goal of finding a home for a family of four.

The exemplary embodiments disclosed herein show that DASH enables user interactions and analysis to move fluidly between text-to-charts and between high level and low level analysis. Text descriptions can typically handle both high- and low-level analysis. For example, it can give specific low-level details like the area of the house size, lot size (square feet), and specific zip codes. Charts are usually lower-level and can show specific data points like trends. Notice also that in the example of FIGS. 5A to 5S, the text descriptions 502, 506, 514, and 528 generated by the LLM address the goal of finding a home for a family of four.

FIGS. 6A to 6E provide a flowchart of an example process for analyzing data, in accordance with some embodiments. The method 600 is performed at a computing device (e.g., computing device 200) that includes a display (e.g., display 212, a display device or a display generation component), one or more processors 202, and memory 206. The memory stores one or more programs configured for execution by the one or more processors. In some embodiments, the operations shown in FIGS. 1, 2A, 2B, 3, 4, and 5A to 5S correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 600 may be combined and/or the order of some operations may be changed.

The computing device displays (602), via a user interface (e.g., user interface 110), first data describing a dataset. In some embodiments, the first data comprises textual (e.g., text) data (e.g., displayed as text, such as text description 502). In some embodiments, the first data comprises visual data (e.g., displayed as a chart, such as chart 510).

The first data has (604) a first modality. In some embodiments, the first modality is (606) one of: a text modality, a chart modality, an audio modality, or a video modality. In some embodiments, the computing device is an AR/VR computing device or a spatial computing device and the first modality comprises an augmented reality (AR) modality or a virtual reality (VR) modality (e.g., one or more virtual elements displayed on the computing device). At least a portion of the first data is (608) encoded with metadata that links the first data to data values and/or data fields of the dataset. For example, as illustrated in FIGS. 5A to 5S, an example dataset can be a dataset of the Seattle real estate market. The dataset includes a plurality of data fields and a plurality of data values associated with the data fields. As also discussed with reference to FIG. 5A, the text description 502 can include underlying metadata, which links to fields and data values.

In some embodiments, the computing device displays (610), via the user interface, a plurality of options. Each of the options corresponds to a respective affordance. For example, in some embodiments, the computing device displays a first option corresponding to a "Tell Me More" affordance 402, and displays a second option corresponding to a "Show Me More" affordance 404, as illustrated in FIGS. 4 and 5A to 5S.

The computing device receives (612) a first user interaction with a first affordance of the user interface. The first user interaction specifies a first portion of the first data that is displayed via the user interface. The first portion of the first data includes at least a first data field ("house" or "lot size", as illustrated in FIG. 5E, or the zip code "98178" as illustrated in FIG. 5B) of the dataset.

In some embodiments, the first affordance of the user interface comprises a graphical element (e.g., an icon) that is displayed on the user interface. In some embodiments, the first affordance of the user interface comprises a virtual graphical element. In some embodiments, the first affordance of the user interface can be the "Tell Me More" affordance 402" or "Show Me More" affordance 404. In some embodiments, the first affordance of the user interface comprises an affordance that enables voice or audio input. In some embodiments, the first affordance of the user interface comprises an affordance that enables input of user gestures.

In some embodiments, the first data comprises (614) chart data that is displayed as a chart (e.g., chart 510) in the user interface. The first portion of the first data comprises one of: a data mark of the chart, a cluster of data points of the chart, a label of the chart, an axis of the chart, or an axis value of the chart.

In some embodiments, the first data comprises (616) text data that is displayed text in the user interface. The first portion of the first data comprises one of: a string of letters or numbers, a phrase, a sentence, or paragraph of text.

In some embodiments, receiving the first user interaction with the first affordance includes receiving (618) user selection of a first option, of the plurality of options, corresponding to the first affordance.

In some embodiments, the first user interaction comprises (620) a drag-and-drop operation. For example, in some embodiments, the first user interaction includes a drag-and-drop action comprising user selection of the first portion of the text and placement of the text over the first affordance that is displayed on the user interface. For example, the transition from FIG. 5B to FIG. 5C illustrates a user interaction that includes dragging the metadata-encoded text 504 corresponding to zip code "98178." and dropping it over the "Tell Me More" affordance 402. In some embodiments, the first user interaction comprises user selection of the first portion of the text, followed by a mouse action (e.g., a left click, right click) selecting the first affordance.)

Referring to FIG. 6B, the computing device, in response to receiving the first user interaction with the first affordance, retrieves (622) metadata corresponding to the first portion of the first data. For example, in some embodiments, the computing device can retrieve the metadata corresponding to the first portion of the first data from browser memory, or from other information sources such as another computing device, a server system, or a database.

In some embodiments, the metadata corresponding to the first portion of the first data comprises (624) an object (e.g., JSON object) that includes a semantic level (e.g., semantic levels 248) corresponding to the first portion of the first data. For example, the semantic levels can be level "1", "2", "3" or "4", as discussed with reference to FIG. 2B.

The computing device generates (626) second data describing the dataset according to (i) the at least the first data field and (ii) data values of the at least the first data field specified in the metadata, corresponding to the first portion of the first data. In some embodiments, the second data comprises textual (e.g., text) data (e.g., displayed as text, such as text description 502). In some embodiments, the second data comprises visual data (e.g., displayed as a chart, such as chart 510).

The second data has (628) a second modality. In some embodiments, the second modality is (630) one of: a text modality, a chart modality, an audio modality, a video modality, an augmented reality (AR) modality, or a virtual reality (VR) modality. In some embodiments, the second modality and the first modality are different modalities. In some embodiments, the second modality and the first modality are the same modality.

In some embodiments, the first data and the second data have (632) different semantic levels. For example, in some embodiments the first data has a lower semantic level than the second data. In some embodiments, the first data has a higher semantic level than the second data.

One example is a text-to-text interaction illustrated in FIGS. 5B to 5D, where a user interaction with lower-level data such as the zip code "98178" causes the computing device to generate a high-level analysis of that zip code in the context of Seattle housing.

Another example is a chart-to-text interaction illustrated in FIGS. 5H to 5J, where user selection of a data mark (e.g., data mark 512) corresponding to the zip code 98121 and placement of the data mark 512 onto the "Tell me More" affordance 402 causes the computing device to generate and display higher level information describing the zip code 98121 in the context of the goal of finding a home for a family of four.

In some embodiments, the first data is (634) text data (e.g., textual data, or information conveyed as alphanumeric strings or paragraphs of words) and the second data is chart data (e.g., information conveyed as a data visualization).

In some embodiments, generating the second data describing the dataset includes determining (636) a chart type for the second data (chart data) according to at least one of: a number (e.g., quantity) of data fields specified in the first portion of the first data (text data), a data type of the data fields specified in the first portion of the first data, and semantics of the data fields specified in the first portion of the first data.

In some embodiments, the computing device determines (638) that the chart type for the second data is a bar chart when the number of data fields specified in the first portion of the first data is one.

In some embodiments, the computing device determines (640) that the chart type for the second data is a scatter plot when the number of data fields specified in the first portion of the first data is two.

Figure 6A:
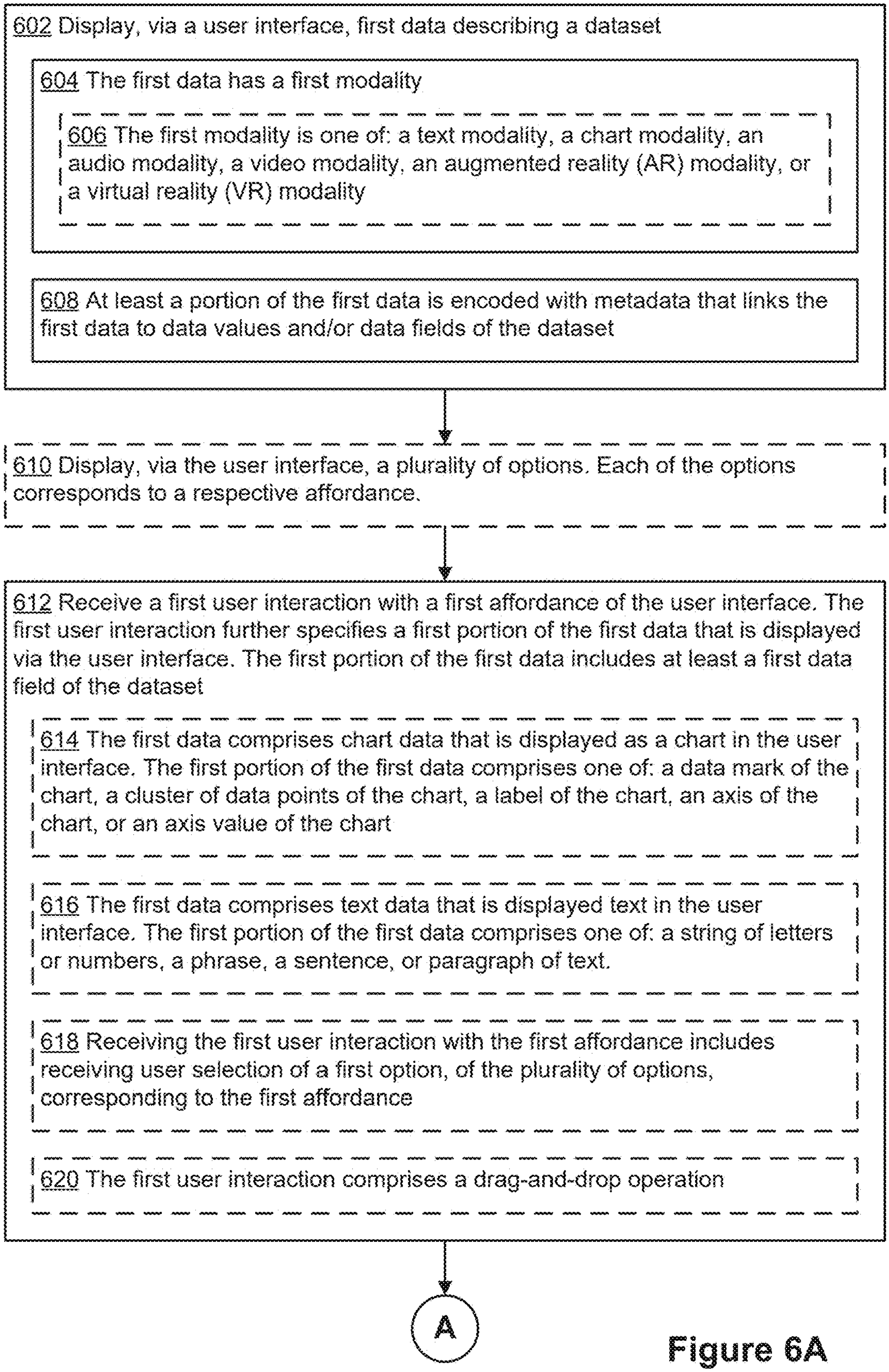
Figure 6C:
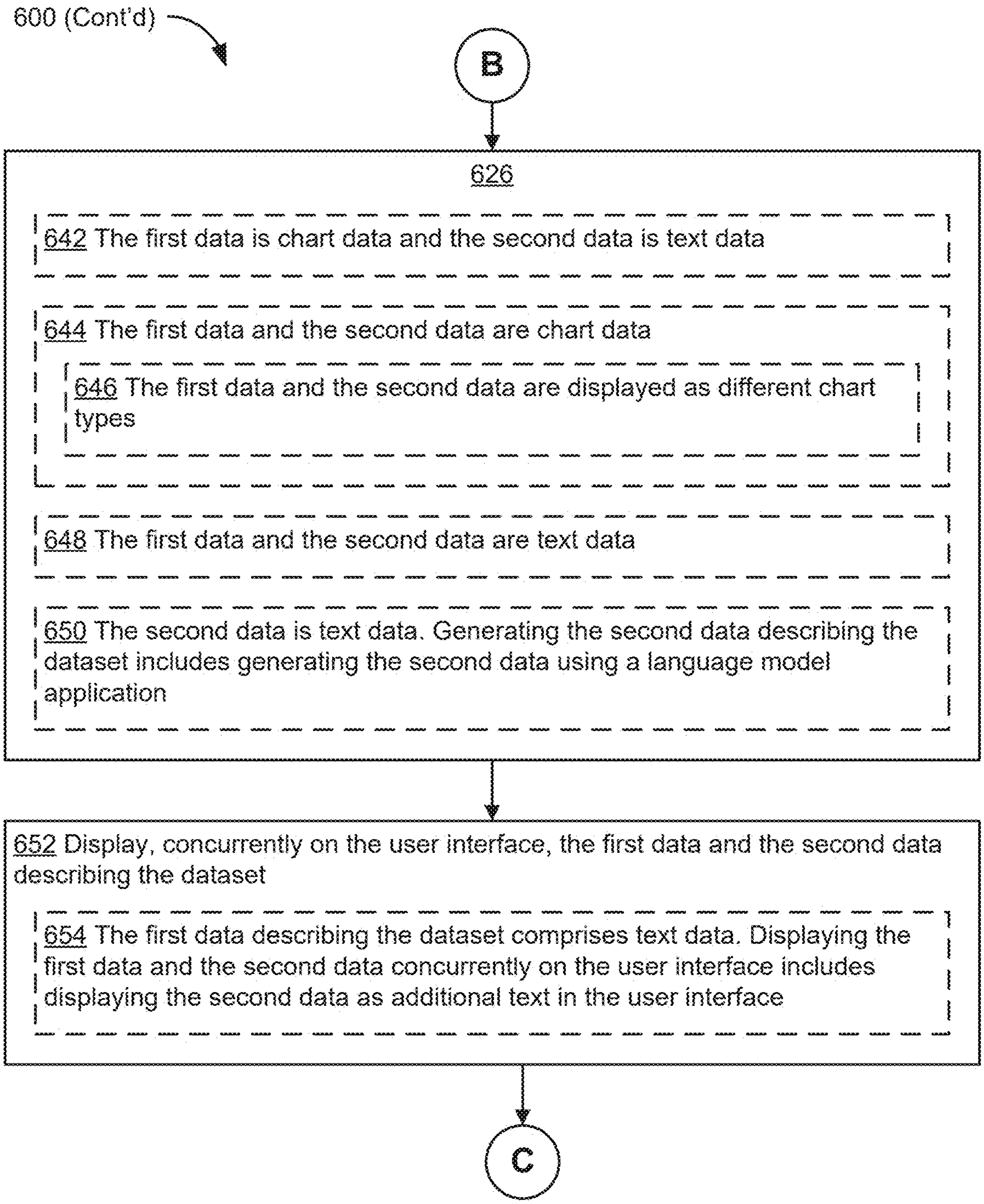

With continued reference to FIG. 6C, in some embodiments, the first data is (642) chart data and the second data is text data.

In some embodiments, the first data and the second data are (644) chart data. For example, the first data can be a data mark of a chart and the second data can be a data mark of another chart.

In some embodiments, the first data and the second data are (646) displayed as different chart types. For example, the first data is displayed as a bar chart and the second data is displayed as a scatter plot.

In some embodiments, the first data and the second data are (648) text data.

In some embodiments, the second data is (650) text data. Generating the second data describing the dataset includes generating the second data using a language model application.

In some embodiments, the language model application executes locally on the computing device. In some embodiments, the language model application executes on the cloud. In some embodiments, the second data can be generated using template-based approaches. For example, the computing device can identify text or chart templates (e.g., stored on the computing device or on the cloud) that are associated with the dataset, where a respective template corresponds to predefined data fields and/or data values of the dataset. In response to receiving a user interaction, the computing device identifies data field(s) and/or data value(s) specified in the user interaction, retrieves the corresponding template, and generates and displays additional data according to the corresponding template.

In some embodiments, the second data can be generated using machine learning (ML) approaches such as few-shot learning (FSL) or collaborative filtering. FSL refers to the problem of learning the underlying pattern in the data just from a few training samples. Parnami and Lee described recently proposed FSL algorithms in their 2022 paper "Learning from Few Examples: A Summary of Approaches to Few-Shot Learning," available at arXiv: 2203.04291, which is incorporated by reference herein in their entirety. Collaborative filtering is a technique used by recommender systems to recommend an item to a user based the interests of a similar user.

The computing device displays (652), concurrently on the user interface, the first data and the second data describing the dataset.

In some embodiments, the interactive analysis comprises a text-to-text analysis. In one example, the computing device displays, via user interface 110, first text data 502 describing a dataset of the Seattle real estate market, as illustrated in FIG. 5A. At least a portion of the first text data is encoded with metadata that links the text data to data values and/or data fields of the dataset. The computing device receives a user interaction with the "Tell Me More" affordance 402. The user interaction specifies a data value "98178" of the zip code data field, as illustrated in FIGS. 5B to 5C. In response to receiving the user interaction, the computing device retrieves metadata corresponding to the zip code "98178" and generates additional text data 506 describing the zip code "98178" in the context of families seeking housing in this zip code. The computing device concurrently displays the first text data and the additional text data in the user interface, as illustrated in FIG. 5D.

In some embodiments, the interactive analysis comprises a text-to-chart analysis. In another example, the computing device displays, via user interface 110, first text data 502 describing a dataset of the Seattle real estate market, as illustrated in FIG. 5E. At least a portion of the first text data is encoded with metadata that links the text data to data values and/or data fields of the dataset. The computing device receives a user interaction with the "Show Me More" affordance 404. The user interaction specifies data fields "House Size" and "Lot Size," as illustrated in FIGS. 5E and 5F. In response to receiving the user interaction, the computing device retrieves metadata corresponding to the data fields "House Size" and "Lot Size," and generates a data visualization (e.g., chart 510) of Average Lot Size per Zip Code versus Average Lot Size per Zip Code, as illustrated in FIG. 5G. The computing device concurrently displays the first text data 502 and the chart 510 via the user interface 110, as illustrated in FIG. 5G.

In some embodiments, the interactive analysis comprises a chart-to-text analysis. In another example, the computing device displays, via user interface 110, a chart 510 describing a dataset of the Seattle real estate market, as illustrated in FIG. 5O. At least a portion of the data in the chart 510 is encoded with metadata that links the text data to data values and/or data fields of the dataset. The computing device receives a user interaction with the "Tell Me More" affordance 402. The user interaction specifies a data mark 522 corresponding to a data value "98112" of the data field, as illustrated in FIGS. 5Q and 5R. In response to receiving the user interaction, the computing device retrieves metadata corresponding to the zip code "98112," and generates text data 528 (see FIG. 5S) describing the zip code "98112" in the context of families seeking housing in this zip code. The computing device concurrently displays the chart 510 and the text data 528 via the user interface 110, as illustrated in FIG. 5S.

In some embodiments, the interactive analysis comprises a chart-to-chart analysis. In yet another example, the computing device displays, via user interface 110, a chart 518 describing Average House Price versus zip code in the Seattle real estate market, as illustrated in FIG. 5M. At least a portion of the data in the chart 518 is encoded with metadata that links the text data to data values and/or data fields of the dataset. The computing device receives a user interaction that selects a data mark 522 (e.g., a graphical element) on the chart 518, corresponding to the zip code "98112," as illustrated in FIGS. 5N and 5O. In response to user selection and placement of the data mark 522 onto another chart 510 that is displayed on the user interface 110, the computing device updates the chart 510 by displaying the data mark corresponding to the zip code "98112," with a different visual characteristic from other data marks in the chart 510, as illustrated in FIG. 5P.

In some embodiments, the "Tell Me More" affordance 402, the "Show Me More" affordance 404, as well as existing text descriptions and charts that are displayed on the user interface 110, are all potential drop targets that are capable of receiving an object (e.g., a JSON object). In some embodiments, when a portion of a text description (e.g., text description 502, 506, 514 or 528) or chart (e.g., chart 510 or chart 518) or any other DASH "payload" is selected and placed (e.g., directly) on an existing chart, data in the existing chart is updated with new data corresponding to the selected portion, and the existing chart is re-rendered to display the new data in the context of the existing data. In some embodiments, when a portion of a text description or chart or any other DASH "payload" is selected and placed (e.g., directly) on an existing text paragraph, that existing paragraph is updated in the context of the previous discussion. Using FIG. 5Q as an example, in some embodiments, when a user selects the data mark 524 corresponding to zip code "98112" and places the data mark 524 onto the text description 506 (i.e., the paragraph itself), the text description 506 updates to describe the zip code "98112" in the context of the existing 98178 discussion (e.g., in the same paragraph). In another example referring to FIG. 5Q, when a user selects the zip code "98101" from the text description 502 and places it onto the text description 506 (i.e., the paragraph itself), the text description 506 updates to describe the zip code "98101" in the context of the existing 98178 discussion, in the same paragraph. With continued reference to FIG. 6C, in some embodiments, the first data describing the dataset comprises (654) text data. Displaying the first data and the second data concurrently on the user interface includes displaying the second data as additional text in the user interface. For example, the additional text can be displayed in a new paragraph following existing paragraphs corresponding to the first data. In some embodiments, the additional text can describe relationships, correlations between different data values and/or data fields of the dataset. In some embodiments, the additional text addresses a predefined objective (e.g., find suitable housing for a family of four, in the example of FIGS. 5A to 5S.

Figure 6D:
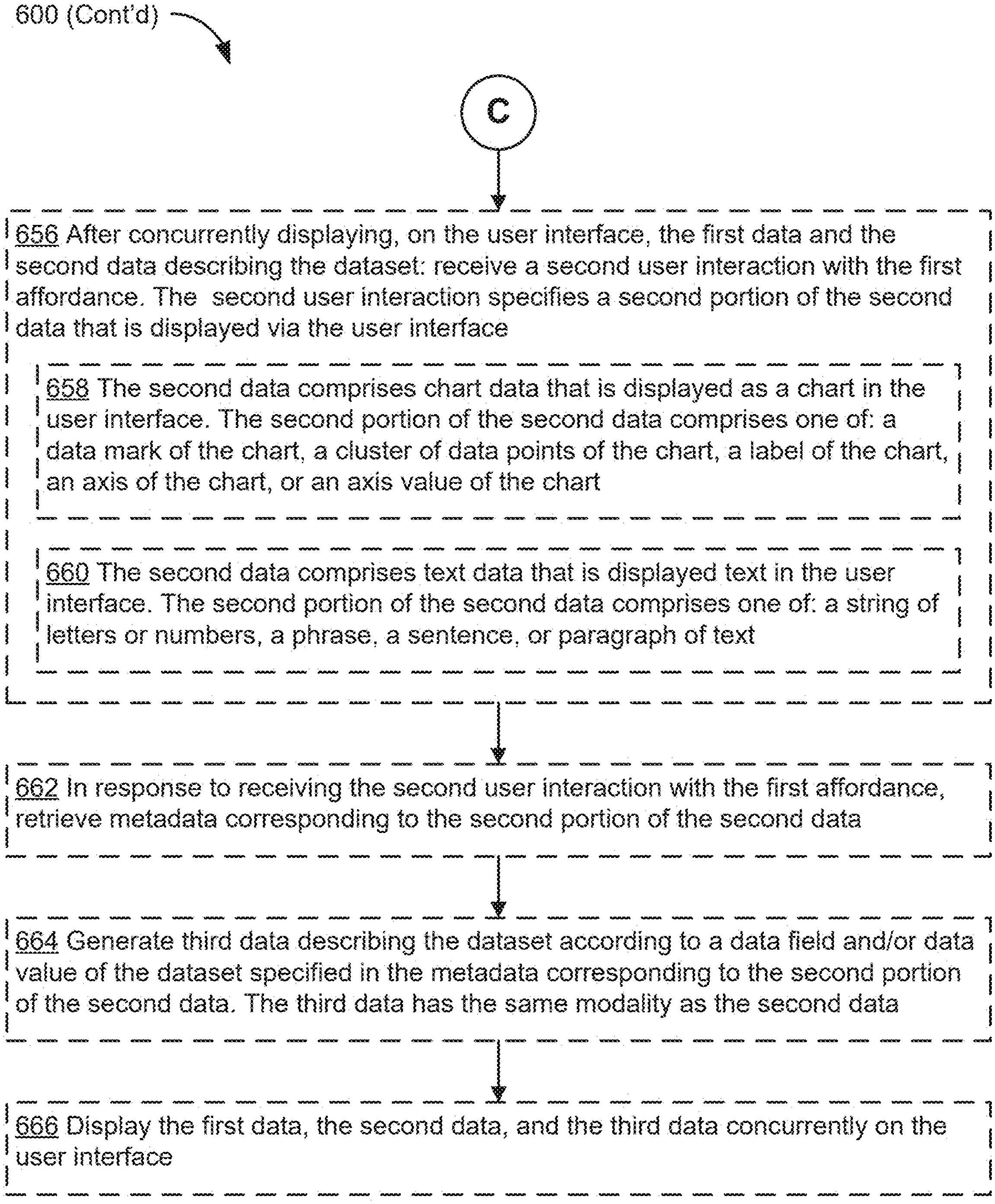

Referring to FIG. 6D, in some embodiments, the computing device, after concurrently displaying, on the user interface, the first data and the second data describing the dataset, receives (656) a second user interaction with the first affordance. The second user interaction specifies a second portion of the second data that is displayed via the user interface (e.g., the second portion of the second data includes a data value or a data field of the dataset).

In some embodiments, the second data comprises (658) chart data that is displayed as a chart in the user interface. The second portion of the second data comprises one of: a data mark of the chart, a cluster of data points of the chart (e.g., the cluster of data points can comprise a line segment when the chart is a line chart, or the cluster of data points can comprise at least two data points when the chart is a scatter plot), a label of the chart (e.g., a title, x-axis label, y-axis label, or a chart annotation), an axis of the chart, or an axis value of the chart (e.g., the chart is a chart of "Average House Price per zip code" versus zip code, as depicted in FIG. 5M. An axis value of the chart can be a value of '800,000' on the y-axis of the chart). In some embodiments, the second portion of the chart can be any pixel of the chart, displayed on the user interface, that is rendered in a data-driven manner, and is in some way representative of the data behind it.

In some embodiments, the second data comprises (660) text data that is displayed text in the user interface. The second portion of the second data comprises one of: a string of letters or numbers (e.g., the zip code "98121" or a word such as "Profit" and "average"), a phrase (e.g., "house and lot sizes"), a sentence (e.g., having some higher level meaning that could be interpreted as a higher level data operation, such as "Northern Europe has an above average healthcare expenditure"), or paragraph of text (e.g., which is more nuanced and general).

In some embodiments, the computing device, in response to receiving the second user interaction with the first affordance, retrieves (662) metadata corresponding to the second portion of the second data.

In some embodiments, the computing device generates (664) third data describing the dataset according to a data field and/or data value of the dataset specified in the metadata corresponding to the second portion of the second data. The third data has the same modality as the second data. (i.e., both the second data and the third data have the second modality). In some embodiments, the computing device displays (666) the first data, the second data, and the third data concurrently on the user interface.

Figure 6E:
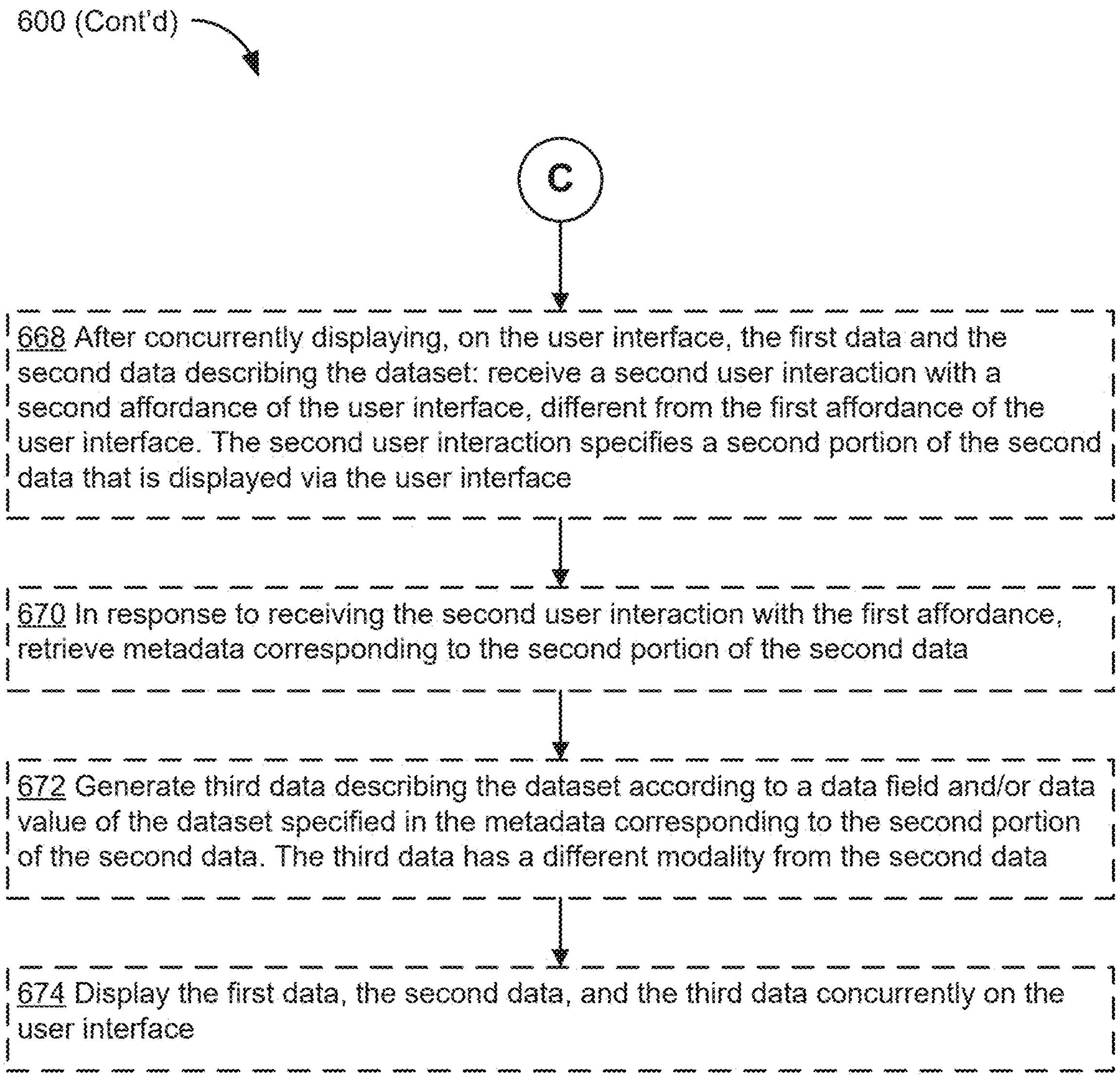

Referring now to FIG. 6E, in some embodiments, the computing device, after concurrently displaying, on the user interface, the first data and the second data describing the dataset, receives (668) a second user interaction with a second affordance of the user interface, different from the first affordance of the user interface. The second user interaction specifies a second portion of the second data that is displayed via the user interface (e.g., the second portion of the second data includes a data value or a data field of the dataset).

In some embodiments, the computing device, in response to receiving the second user interaction with the first affordance, retrieves (670) metadata corresponding to the second portion of the second data.

In some embodiments, the computing device generates (672) third data describing the dataset according to a data field and/or data value of the dataset specified in the metadata corresponding to the second portion of the second data. The third data has a different modality from the second data. In some embodiments, the third data has the same modality as the first data (i.e., the first and third data have the first modality). In some embodiments, the third data has a third modality that is different from the first modality. In some embodiments, the third modality is one of: a text modality, a chart modality, an audio modality, a video modality, an augmented reality (AR) modality, or a virtual reality (VR) modality.

In some embodiments, the computing device displays (674) the first data, the second data, and the third data concurrently on the user interface.

Although FIGS. 6A to 6E illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In accordance with some embodiments, a method of analyzing data is performed at a computing device that includes a display, one or more processors, and memory. The method includes displaying, via a user interface, first data describing a dataset. The first data has a first modality and at least a portion of the first data is encoded with metadata that links the first data to data values and/or data fields of the dataset. The method includes receiving a first user interaction with a first affordance of the user interface. The first user interaction further specifies a first portion of the first data that is displayed via the user interface. The first portion of the first data includes at least a first data field of the dataset. The method includes, in response to receiving the first user interaction with the first affordance: (a) retrieving metadata corresponding to the first portion of the first data; (b) generating second data describing the dataset according to (i) the at least the first data field and (ii) data values of the at least the first data field specified in the metadata, corresponding to the first portion of the first data, the second data having a second modality; and (c) displaying, concurrently on the user interface, the first data and the second data describing the dataset.

(A2) In some embodiments of A1, the first data and the second data have different semantic levels.

(A3) In some embodiments of A1 or A2, the first modality or the second modality is one of: a text modality, a chart modality, an audio modality, a video modality, an augmented reality (AR) modality, or a virtual reality (VR) modality.

(A4) In some embodiments of any of A1-A3, the method includes after concurrently displaying, on the user interface, the first data and the second data describing the dataset: receiving a second user interaction with the first affordance. The second user interaction specifies a second portion of the second data that is displayed via the user interface. The method includes in response to receiving the second user interaction with the first affordance: retrieving metadata corresponding to the second portion of the second data; generating third data describing the dataset according to a data field and/or data value of the dataset specified in the metadata corresponding to the second portion of the second data, wherein the third data has the same modality as the second data; and displaying the first data, the second data, and the third data concurrently on the user interface.

(A5) In some embodiments of A4, the second data comprises chart data that is displayed as a chart in the user interface. The second portion of the second data comprises one of: a data mark of the chart, a cluster of data points of the chart, a label of the chart, an axis of the chart, or an axis value of the chart.

(A6) In some embodiments of A4 or A5, the second data comprises text data that is displayed text in the user interface. The second portion of the second data comprises one of: a string of letters or numbers, a phrase, a sentence, or paragraph of text.

(A7) In some embodiments of any of A1-A6, the first data describing the dataset comprises text data. Displaying the first data and the second data concurrently on the user interface includes the second data as additional text in the user interface.

(A8) In some embodiments of any of A1-A7, the method includes after concurrently displaying, on the user interface, the first data and the second data describing the dataset, receiving a second user interaction with s second affordance of the user interface. The second affordance is different from the first affordance of the user interface. The second user interaction specifies a second portion of the second data that is displayed via the user interface. The method includes in response to receiving the second user interaction with the first affordance: retrieving metadata corresponding to the second portion of the second data; generating third data describing the dataset according to a data field and/or data value of the dataset specified in the metadata corresponding to the second portion of the second data, where the third data has a different modality from the second data; and displaying the first data, the second data, and the third data concurrently on the user interface.

(A9) In some embodiments of any of A1-A8, the first data is text data and the second data is chart data.

(A10) In some embodiments of A9, generating the second data describing the dataset includes determining a chart type for the second data according to at least one of: a number of data fields specified in the first portion of the first data, a data type of the data fields specified in the first portion of the first data, and semantics of the data fields specified in the first portion of the first data.

(A11) In some embodiments of A10, the method includes, when the number of data fields specified in the first portion of the first data is one, determining that the chart type for the second data is a bar chart; or when the number of data fields specified in the first portion of the first data is one, determining that the chart type for the second data is a scatter plot.

(A12) In some embodiments of any of A1-A11, the first data is chart data and the second data is text data.

(A13) In some embodiments of any of A1-A12, the first data and the second data are chart data.

(A14) In some embodiments of A13, the first data and the second data are displayed as different chart types.

(A15) In some embodiments of any of A1-A14, the first data and the second data are text data.

(A16) In some embodiments of any of A1-A15, the second data is text data. Generating the second data describing the dataset includes generating the second data using a language model application.

(A17) In some embodiments of any of A1-A16, the method includes displaying a plurality of options, each of the options corresponding to a respective affordance. Receiving the first user interaction with the first affordance includes receiving user selection of a first option, of the plurality of options, corresponding to the first affordance.

(A18) In some embodiments of any of A1-A17, the metadata corresponding to the first portion of the first data comprises an object that includes a semantic level corresponding to the first portion of the first data.

(A19) In some embodiments of any of A1-A18, the first user interaction comprises a drag-and-drop operation.

(B1) In accordance with some embodiments, a computing device includes a display, one or more processors, and memory coupled to the one or more processors, the memory storing instructions that, when executed by the one or more processors, cause the computing device to perform the method of any of A1-A19.

(C1) In accordance with some embodiments, a computer-readable storage medium stores one or more programs that, when executed by one or more processors of a computing device, cause the computing device to perform the method of any of A1-A19.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails each of the following possibilities: A only, B only, Conly, A and B without C, A and C without B, B and C without A, and a combination of A, B, and C.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of analyzing data, performed at a computing device that includes one or more processors and memory, the method comprising:

displaying, via a user interface, first data describing a dataset, wherein the first data has a first modality and a first portion of the first data is encoded as a data object that includes metadata information having (i) a semantic level of the first portion of the first data, (ii) a data value of the dataset, and (iii) a data field of the dataset;

receiving a first user interaction with a first affordance that is displayed on the user interface, the first user interaction further specifying the data object; and in response to receiving the first user interaction with the first affordance:

retrieving the metadata information corresponding to the data object;

generating second data describing the dataset according to the retrieved metadata information, the generating includes assigning a semantic level to the second data according to a modality of the second data, wherein the second data has a second modality and the semantic level of the second data is different from the semantic level of the first portion of the first data; and concurrently displaying, on the user interface, the first data and the second data describing the dataset.

2. The method of claim 1, wherein the first modality or the second modality is one of:

a text modality, a chart modality, an audio modality, a video modality, an augmented reality (AR) modality, or a virtual reality (VR) modality.

3. The method of claim 1, further comprising:

after concurrently displaying, on the user interface, the first data and the second data describing the dataset:

receiving a second user interaction with the first affordance, the second user interaction specifying a second portion of the second data that is displayed via the user interface; and in response to receiving the second user interaction with the first affordance:

retrieving metadata corresponding to the second portion of the second data;

generating third data describing the dataset according to a data field and/or data value of the dataset specified in the metadata corresponding to the second portion of the second data, wherein the third data has the same modality as the second data; and displaying the first data, the second data, and the third data concurrently on the user interface.

4. The method of claim 3, wherein:

the second data comprises chart data that is displayed as a chart in the user interface; and the second portion of the second data comprises one of: a data mark of the chart, a cluster of data points of the chart, a label of the chart, an axis of the chart, or an axis value of the chart.

5. The method of claim 3, wherein:

the second data comprises text data that is displayed text in the user interface; and the second portion of the second data comprises one of: a string of letters or numbers, a phrase, a sentence, or paragraph of text.

6. The method of claim 1, wherein:

the first data describing the dataset comprises text data; and displaying the first data and the second data concurrently on the user interface includes the second data as additional text in the user interface.

7. The method of claim 1, further comprising:

after concurrently displaying, on the user interface, the first data and the second data describing the dataset:

receiving a second user interaction with a second affordance of the user interface, different from the first affordance of the user interface, the second user interaction specifying a second portion of the second data that is displayed via the user interface; and in response to receiving the second user interaction with the first affordance:

retrieving metadata corresponding to the second portion of the second data;

generating third data describing the dataset according to a data field and/or data value of the dataset specified in the metadata corresponding to the second portion of the second data, wherein the third data has a different modality from the second data; and displaying the first data, the second data, and the third data concurrently on the user interface.

8. The method of claim 1, wherein:

the first data is text data and the second data is chart data.

9. The method of claim 8, wherein generating the second data describing the dataset includes determining a chart type for the second data according to at least one of: a number of data fields specified in the first portion of the first data, a data type of the data fields specified in the first portion of the first data, and semantics of the data fields specified in the first portion of the first data.

10. The method of claim 9, further comprising:

when the number of data fields specified in the first portion of the first data is one, determining that the chart type for the second data is a bar chart; or when the number of data fields specified in the first portion of the first data is one, determining that the chart type for the second data is a scatter plot.

11. The method of claim 1, wherein:

the first data is chart data and the second data is text data.

12. The method of claim 1, wherein the first data and the second data are chart data.

13. The method of claim 12, wherein the first data and the second data are displayed as different chart types.

14. The method of claim 1, wherein the first data and the second data are text data.

15. The method of claim 1, wherein:

the second data is text data; and generating the second data describing the dataset includes generating the second data using a language model application.

16. The method of claim 1, further comprising:

displaying a plurality of options, each of the options corresponding to a respective affordance, wherein receiving the first user interaction with the first affordance includes receiving user selection of a first option, of the plurality of options, corresponding to the first affordance.

17. The method of claim 1, wherein the first user interaction with the first affordance includes placement of the data object over the first affordance.

18. A computing device, comprising:

one or more processors; and memory coupled to the one or more processors, the memory storing one or more programs for execution by the one or more processors, the one or more programs including instructions for:

displaying, via a user interface, first data describing a dataset, wherein the first data has a first modality and a first portion of the first data is encoded as a data object that includes metadata information having (i) a semantic level of the first portion of the first data, (ii) a data value of the dataset, and (iii) a data field of the dataset;

receiving a first user interaction with a first affordance that is displayed on the user interface, the first user interaction further specifying the data object; and in response to receiving the first user interaction with the first affordance:

retrieving the metadata information corresponding to the data object;

generating second data describing the dataset according to the retrieved metadata information, the generating includes assigning a semantic level to the second data according to a modality of the second data, wherein the second data has a second modality and the semantic level of the second data is different from the semantic level of the first portion of the first data; and concurrently displaying, on the user interface, the first data and the second data describing the dataset.

19. A non-transitory computer-readable medium storing one or more programs, the one or more programs comprising instructions that, when executed by one or more processors of a computing device, cause the computing device to perform operations comprising:

displaying, via a user interface, first data describing a dataset, wherein the first data has a first modality and a first portion of the first data is encoded as a data object that includes metadata information having (i) a semantic level of the first portion of the first data, (ii) a data value of the dataset, and (iii) a data field of the dataset;

receiving a first user interaction with a first affordance that is displayed on the user interface, the first user interaction further specifying the data object; and in response to receiving the first user interaction with the first affordance:

retrieving the metadata information corresponding to the data object;

generating second data describing the dataset according to the retrieved metadata information, the generating includes assigning a semantic level to the second data according to a modality of the second data, wherein the second data has a second modality and the semantic level of the second data is different from the semantic level of the first portion of the first data; and concurrently displaying, on the user interface, the first data and the second data describing the dataset.

* * * * *